United States Patent
Johansson

(10) Patent No.: US 8,011,357 B2
(45) Date of Patent: Sep. 6, 2011

(54) CUTTING AND DUST COLLECTING ASSEMBLY AND WORKING MACHINE WITH SUCH ASSEMBLY

(75) Inventor: Mats Johansson, Torslanda (SE)

(73) Assignee: Husqvarna Aktiebolag, Huskvarna (SE)

( * ) Notice: Subject to any disclaimer, the term of this patent is extended or adjusted under 35 U.S.C. 154(b) by 980 days.

(21) Appl. No.: 11/884,361

(22) PCT Filed: Feb. 2, 2006

(86) PCT No.: PCT/SE2006/050002
§ 371 (c)(1),
(2), (4) Date: Aug. 29, 2007

(87) PCT Pub. No.: WO2006/088426
PCT Pub. Date: Aug. 24, 2006

(65) Prior Publication Data
US 2008/0163492 A1   Jul. 10, 2008

(30) Foreign Application Priority Data
Feb. 18, 2005  (SE) ...................................... 0500404

(51) Int. Cl.
*B28D 1/04* (2006.01)
*B24D 55/05* (2006.01)
(52) U.S. Cl. .................. 125/13.01; 125/13.03; 451/451; 451/456; 30/124; 30/390
(58) Field of Classification Search .................. 451/451, 451/456; 125/13.01, 13.03; 30/124, 390, 30/391; 83/100
See application file for complete search history.

(56) References Cited

U.S. PATENT DOCUMENTS

| | | | | |
|---|---|---|---|---|
| 3,882,598 A * | 5/1975 | Earle et al. | ....................... | 30/390 |
| 4,022,182 A * | 5/1977 | Lenkevich | ................. | 125/13.01 |
| 5,774,992 A * | 7/1998 | Lindenmuth | ................... | 30/124 |
| 6,827,640 B2 * | 12/2004 | Bures et al. | .................... | 451/456 |
| 6,935,939 B1 * | 8/2005 | Buser et al. | .................... | 451/451 |
| 7,241,211 B2 * | 7/2007 | Baratta | ......................... | 451/455 |
| 7,526,866 B2 * | 5/2009 | Schnell et al. | .................. | 30/124 |
| 2003/0213482 A1 | 11/2003 | Buser et al. | | |
| 2003/0220060 A1* | 11/2003 | Bures et al. | .................... | 451/456 |
| 2004/0129261 A1 | 7/2004 | Baratta | | |

FOREIGN PATENT DOCUMENTS

GB        2 339 315 A     9/2004

\* cited by examiner

*Primary Examiner* — Eileen P. Morgan
(74) *Attorney, Agent, or Firm* — Nixon & Vanderhye

(57) ABSTRACT

A cutting and dust collecting assembly comprises a rotatable, circular saw blade (4) having a first side (20), a second side (21), and a cover device (6) with a terminal member (52). The bottom surface (36) of the cover device extends in a plane. A longitudinal passage (45, 46) for the saw blade extends through the cover device from its top surface to its bottom surface. The terminal member comprises a terminal chamber (60) having an inlet (45*a*), the mouth of which coincides with the plane of said bottom surface. An outlet (58) can be connected to a vacuum source. The direction of rotation of the operating blade is such that the rear part (4*a*) of the saw blade which has passed beyond the bottom surface of the cover device will move in a direction upwards-rearwards towards the bottom surface. The invention also concerns the cover device, a sealing body belonging to the cover device and a working machine which is provided with the cutting and dust collecting assembly.

18 Claims, 13 Drawing Sheets

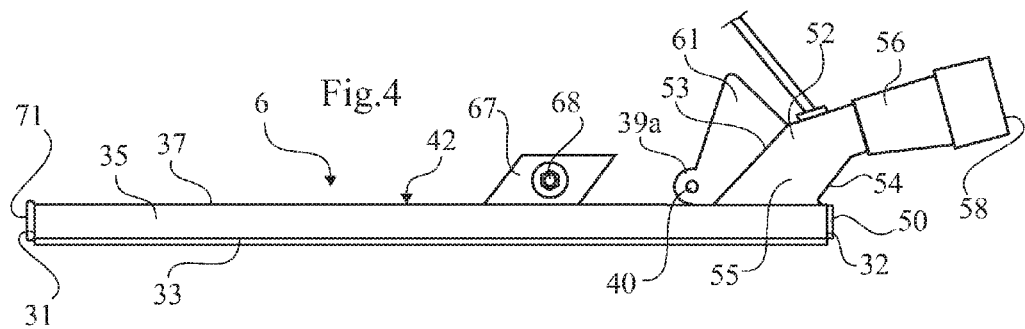
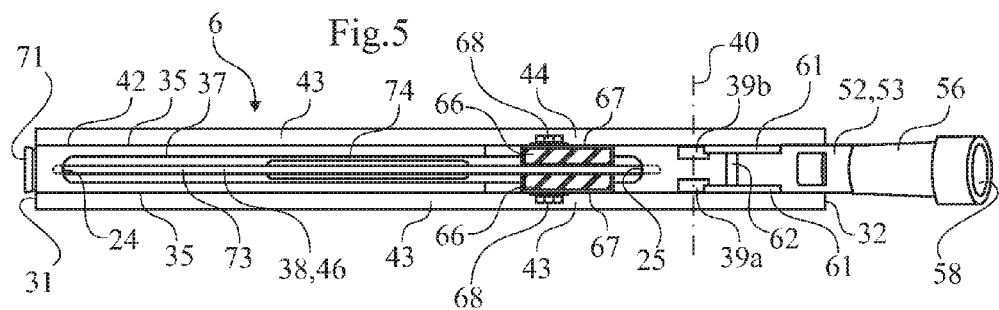
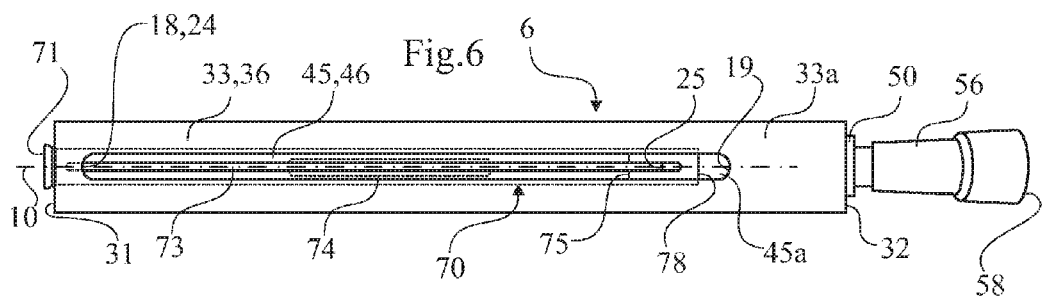
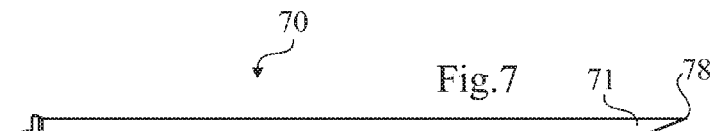
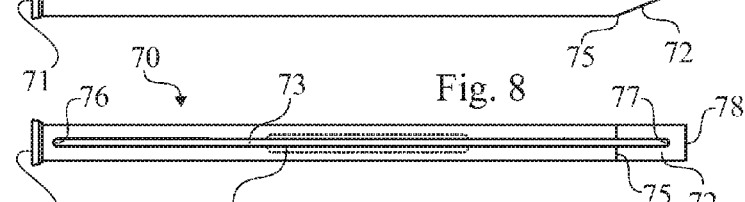

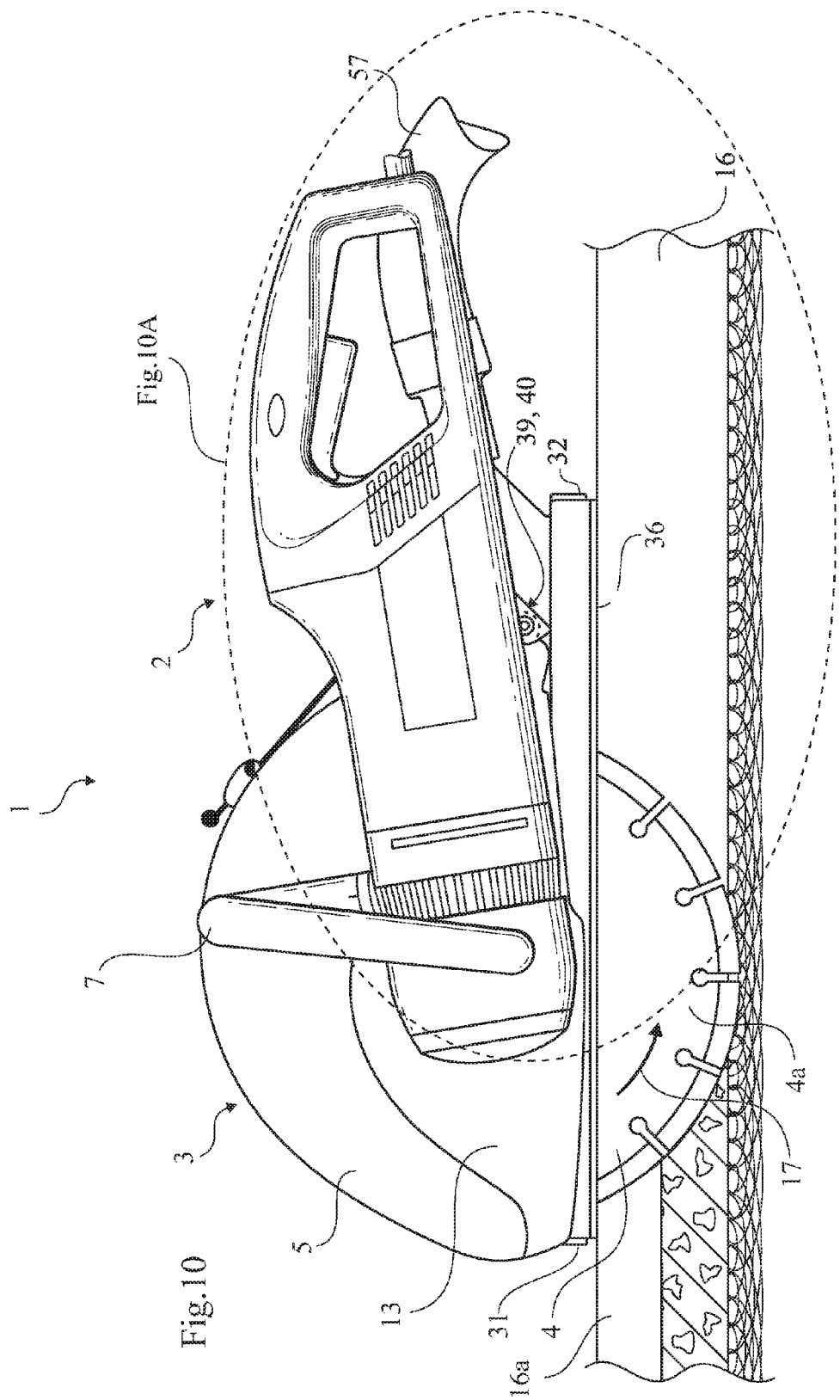

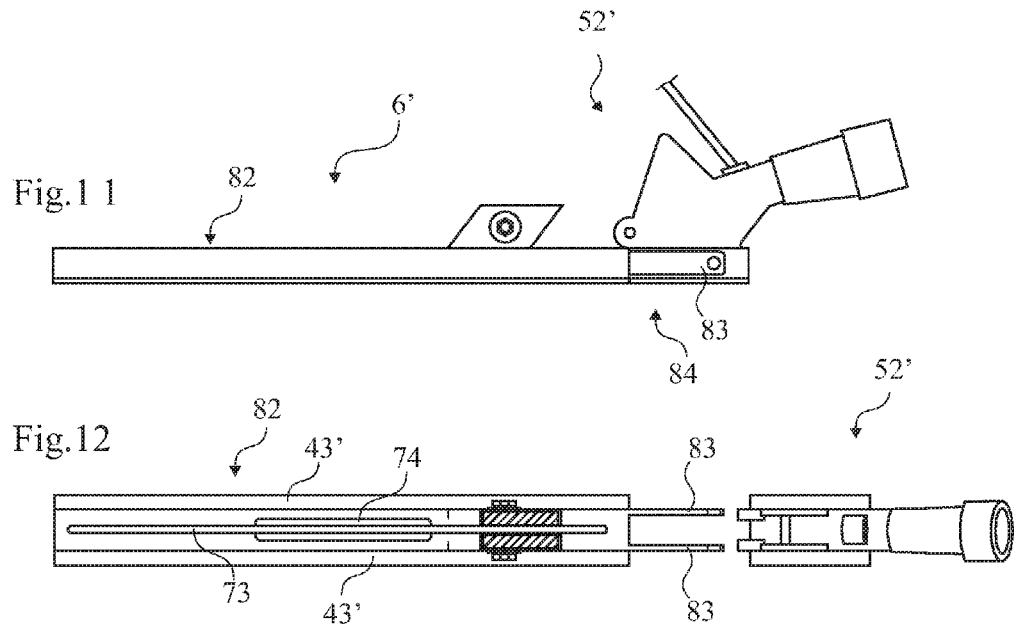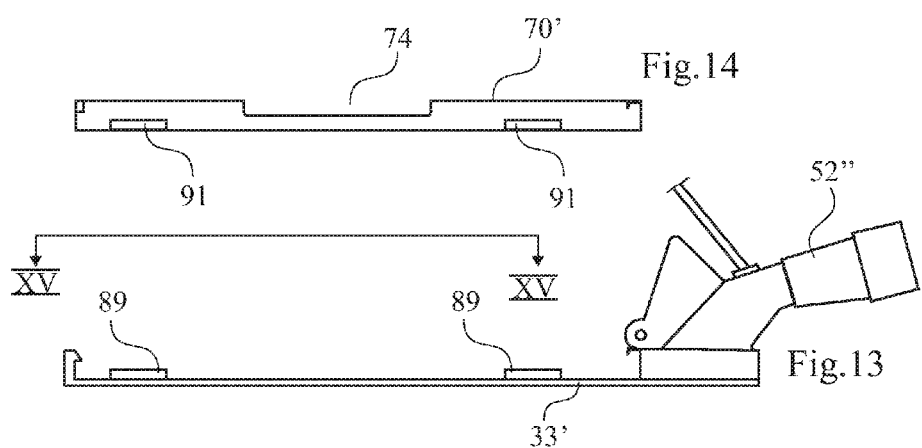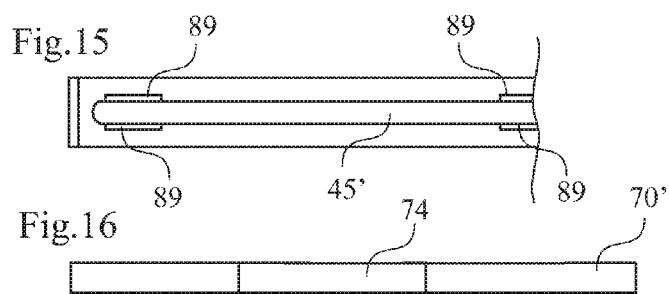

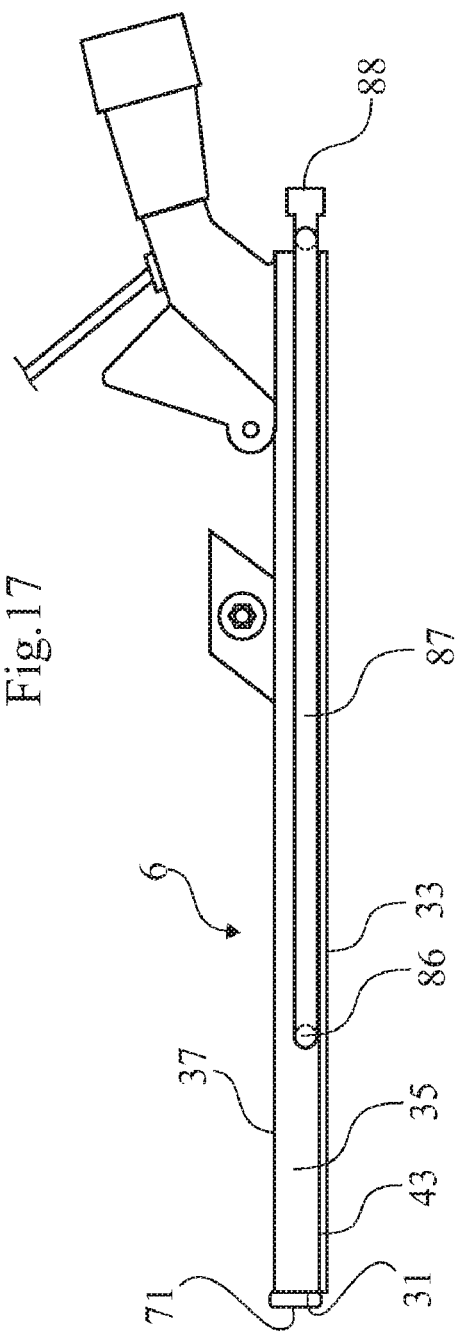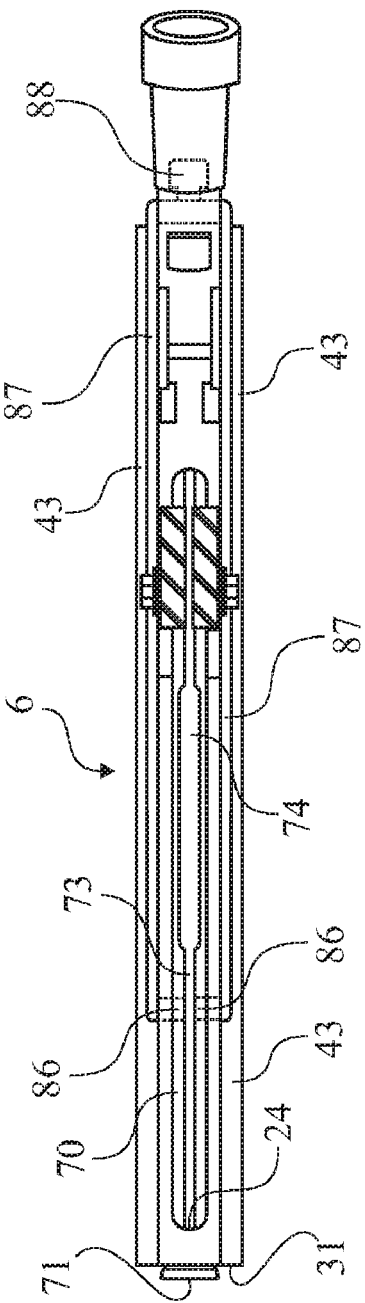

CUTTING AND DUST COLLECTING ASSEMBLY AND WORKING MACHINE WITH SUCH ASSEMBLY

This application is the U.S. National Phase of International Application PCT/SE2006/050002, filed 2 Feb. 2006, which designated the U.S. PCT/SE2006/050002 claims priority to Swedish Application No. 0500404-9 filed 18 Feb. 2005. The entire content of these applications are incorporated herein by reference.

TECHNICAL FIELD

The present invention relates to a cutting and dust collecting assembly for the provision of a kerf (saw cut) with significant depth in a working object, and for collecting and leading away dust which is generated in the kerf. The invention also relates to a dust collecting unit included in the assembly, a cover device included in the dust collecting unit, a sealing body included in the cover device, and a working machine which is provided with a cutting and dust collecting assembly according to the invention. Particularly, the invention relates to devices of the said kind for making openings in working objects like walls, ceilings, and floors of concrete, stone, brick, and plasterboard in the construction industry, and for cutting blocks and columns of concrete, stone, and the like. Such objects often may have large dimensions, but that is not any condition for the applications of the invention. It shall be understood that "cutting assembly" not only includes assemblies for cutting off a work piece but also assemblies for sawing or cutting in objects more generally, for example making holes or openings in work pieces. Normally, "cutting assemblies", such as the cutting assembly according to the invention, can perform all these kinds of work. The terms sawing and cutting, in the following generally referred to as sawing, in this text shall mean every kind of making kerfs/cuts in working objects by means of disk-shaped rotary tools, the working part of which is localized to the periphery of the tool, whether the tool is provided with teeth or not. Typically, the tool consists of a diamond equipped saw blade or a cutting disc, in the following commonly referred to as saw blade.

BACKGROUND OF THE INVENTION

When sawing concrete, brick, stone, wood, plasterboards and similar materials, dust is generated, usually large amounts thereof. Many devices of different type are employed in order to prevent, as far as that is possible, but the dust is scattered to the environment, while other devices have been suggested but have not been used. Thus devices exist, whos mode of working, according to a known principle, makes use of a hood-shaped blade guard or the like, which surrounds the saw blade and in which dust is collected and is sucked away to a vacuum device via a hose, which is connected to the blade guard. A machine and a device of that kind is disclosed in WO 02/100597. It is typical and necessary that this known hood-shaped blade guard completely surrounds that part of the saw blade which is not located in the work piece, and that the blade guard contacts the surface of the work piece, which surface is supposed to be essentially flat, and with good sealing action, in order that the device shall function well as a dust collector. The blade guard thus shall function like a suction box, in which a sufficient underpressure must be maintained in order to suck up into the blade guard that dust which is generated in the kerf and which is not thrown backwards-upwards by the tool. At the same time, dust must not be scattered to the environment from the kerf and/or due to leakage between the blade guard and the top surface of the work piece. In connection with devices which are based on this principle, however, some fundamental problems are encountered. The first problem is that the volume in the suction box, i.e. the interior volume of the hood-shaped blade guard, is comparatively large, which is a drawback because it makes it more difficult to maintain a necessary underpressure in the suction box, which in turn jeopardises its suction capacity. The second problem is that the device will not function at all during an initial phase of a working operation, when a kerf has not yet been established in a work piece to a sufficient depth. During this phase, the blade guard can not seal satisfactorily against the work piece, which means that most of the dust will be scattered to the environment. This is particularly true when working in concrete, brick, stone, plasterboards and the like by means of cutter disks which generate a large amount of very fine dust. Therefore, it can be impossible to work in such materials in furnished or from other reasons sensitive premises with this type of devices, if the dust collector is not supplied with auxiliary means for preventing scattering of dust. Therefore it is common practise to successively spray water into the kerf as the kerf is being formed, in order to bind the dust, preventing it to be scattered to the environment, such as according to said WO 02/100597. This however, causes a slurry to be generated, which gives rise to a new problem.

U.S. Pat. No. 5,167,215 discloses a wheel carried concrete sawing saw, which also includes an apparatus for collecting and evacuating the dust which is generated when sawing in concrete. This apparatus is equipped with an auxiliary unit allowing collection of dust also during the initial phase of a sawing operation. The auxiliary unit consists of a funnel, which is pivotally connected to a blade guard and provided with a lower, transversal edge, which contacts the top surface of the work piece, sliding against said top surface behind the saw blade when the machine is moving forwards and the saw blade is working in the work piece. Said "funnel" is turned upwards-rearwards behind the blade guard, when the blade proceeds deeper and deeper into the work piece. The intention with the apparatus is that the concrete dust which is produced during the sawing operation shall be thrown rearwards-upwards into said "funnel" and then be sucked away from the funnel through a suction hose connected to the apparatus. The method is based on the premise that the saw blade will act as an efficient sling and that the trailing device will collect essentially all the concrete dust that is generated during the sawing operation. This assumption, however, appears to be based on an underestimation of the capacity of concrete dust to scatter from spaces, e.g. the kerf itself, which are not subject to an effective underpressure relative to the surrounding space. The apparatus and the machine according to U.S. Pat. No. 5,167,215 therefore do not provide an acceptable solution of the dusting problem in connection with sawing concrete and similar materials. Besides, it is not possible to work more than in one direction—forwards—by means of this machine and apparatus, which is another inconvenience.

DISCLOSURE OF THE INVENTION

It is the purpose of the invention to prevent scattering of dust when sawing in materials which have a tendency to generate dust, according to other principles than those which are typical according to prior art as exemplified e.g. through the above mentioned references. While the apparatus according to WO 02/100597 is based on the principle of employing the entire volume of a completely shrouding blade guard as a suction box, from where the dust is sucked away via a hose connected to a vacuum source, and the apparatus according to U.S. Pat. No. 5,167,215 is based on the assumption that the saw blade has a capacity to through essentially all dust up into a "funnel" trailing after the blade guard, from where the dust is sucked away through a suction hose, the present invention is based on the principle of establishing a "mini suction box in situ" in a limited section of the kerf. This limited section comprises a front section, within which the saw blade is entered or can be entered into the kerf, and a rear section immediately behind said front section. This is achieved therein that the cutting and dust collection assembly, according to an aspect of the invention, includes a cover device which sufficiently well restricts the passages for air at the side of the saw blade and between the cover device and the surface and the work piece within the region of said restricted section of the kerf, and whereas a chamber in a terminal section of the cover device which has an outlet opening, which can be or is connected to a vacuum source, is provided with an inlet port which is provided and positioned such that it is shrouded relative to environment, can be connected to said "mini suction box", i.e. to the restricted region of the kerf, preferably to its said rear section. By means of an assembly which is equipped in that way and by means of a working machine which is provided with an assembly equipped in that way, a primary objective of the invention can be satisfied, namely to efficiently collect and remove the dust which is generated in connection with sawing in concrete and other materials which have a tendency to cause dust formation.

It is also a purpose of the invention to provide an assembly which can be exployed in many different types of working machines using circular saw blades; portable machines as well as rail-mounted machines and/or machines mounted on other mobile carriers.

According to this wide aspect of the invention, the cutting and dust collecting assembly is characterised in that it comprises a rotatable, circular saw blade having a first side, a second side, a peripheral portion defining the working part of the saw blade, and a centre of rotation, that it also comprises a cover device with a terminal member in a rear part of the cover device, that the cover device has a front end, a rear end, a top surface, a bottom surface extending in a plane, and a longitudinal passage for the saw blade, said passage extending through the cover device from its top surface to its bottom surface in a region between the front and rear ends of the cover device, that the saw blade can be moved up and down in said passage, a segment of the saw blade passing through the bottom surface of the cover device, during which movement said centre of rotation, which is positioned above the cover device, is displaced relative to the cover device, that the terminal member includes a terminal chamber having an inlet, the mouth of which coincides with the plane of said bottom surface, and an outlet which can be connected to a vacuum source, and that the direction of rotation of the operating blade is such that the rear part of said segment which has passed beyond the bottom surface of the cover device will move in a direction upwards-rearwards towards the bottom surface, said direction being clock-wise when the saw blade is viewed in a direction towards the first side of the blade. It is also a typical feature that sealing members are provided in said passages, which contact or almost contact the surfaces of the saw blades inside of its peripheral portion so that the flow of air through the passage is significantly reduced.

However, the invention has been developed in the first case for portable manually operated machines. Therefore, other objectives of the invention is to provide a working machine and an assembly of the above mentioned type intended for the machine, which is easy to operate forwards as well as rearwards, horizontally as well as vertically; in short, satisfies high ergonomic demands. These and other purposes can be satisfied therein that the cutting and dust collecting assembly comprises a) a circular saw blade having a first side, a second side, and a centre of rotation, the direction of rotation being clock-wise if the saw blade is viewed in a direction towards the first side of the blade, b) a blade guard extending over the saw blade around at least half its circumference, a side wall of the blade guard on the second side of the blade covering or at least substantially extending around the centre of rotation of the blade, and c) a cover device having a front end, a rear end, a top member with a top surface, a base plate with a bottom surface extending in a plane, and a longitudinal passage for the saw blade, said passage extending through the cover device from the top surface to the bottom surface in a region between the front and rear ends of the cover device, d) the cover device being pivotally connected to the blade guard via a hinge such that the saw blade can be moved upwards and downwards in the cover device through turning in said hinge, and that e) a terminal member is provided in a section at the rear of said hinge, comprising a terminal chamber having an inlet with an inlet port which coincides with the plane of said bottom surface, and an outlet which can be connected to a vacuum source.

Suitably, the above mentioned hinge is positioned in or adjacent to a lower, rear corner of the blade guard. The main components of the dust collecting unit which also is subject to protection through patent, consists of the cover device and the blade guard in combination with one another, which components are adapted to one another to form a functionally cooperating unit, which can be employed for different driving units and saw blades.

According to a referred embodiment, the cover device comprises a front chamber in front of the terminal member, said front chamber, which may be elongated, is restricted upwards by a top-member, laterally by sidewalls and downwards by a bottom (in the following also referred to as base plate) with said bottom surface, said passage for the saw blade including an upper slot in the top member and a lower slot in the base plate. The terms "upper slot" and "lower slot" shall not be interpreted in any restricting sense as far as the width of the slots is concerned. The width can namely be quite large and extend over the major part of the top surface and over a significant portion of the bottom surface, respectively. However, the width is significant smaller than the length of the slot. Therefore the term "slot" in this connection after all should be adequate. Conveniently, said parts of the cover device are made of steel or other suitable metal material. Unavoidable vibrations of the saw blade, as well as possible errors concerning the centering of the saw blade in relation to the slots in the cover device, pose a risk that the saw blade will touch the edges of the slots, when the saw blade operates, rotating in the cover device, if the slots are too narrow. For safety's sake they are therefore comparatively wide in the preferred embodiment. This, on the other hand, causes a new problem; difficulties for the cover device to perform its main task, namely to shroud the established kerf in the work piece from the environment within a section of the length of the kerf.

This problem is solved according to another aspect of the invention by means of a sealing body which can be entered into the front chamber, which sealing body can be provided with a slot extending through the sealing body between its top surface and bottom surface. Such slot, prepared in advance, is suitably approximately as wide as the saw blade is thick in its peripheral, working part, so that the sealing body can prevent or significantly restrict the flow of air through the cover device. Suitably, the sealing body consists of an organic material, which does not cause any wear of the saw blade. It also conceivable that the sealing body initially is not provided with any slot, which instead can be made in situ by means of the saw blade itself, when the sealing body is accommodated in the cover device. This is possible, when the sealing body consists of any of a plurality of conceivable organic materials with moderate hardness, such as most hard plastic materials. Other conceivable materials may be cellulosic, including wood. Also soft metals are conceivable, as well as oil-impregnated bearing metals, and others. Also various soft, possibly resilient materials, like resilient soft plastic materials and/or felt materials might be useful as well as various composite materials. Preferably, however, the sealing body, whether the slot is preparated in advance or not, consists of a cheap plastic material, such as polyethen, allowing it to be manufactured at a low cost, which is negligible in comparison with the cost for a diamond equipped saw blade. In this case, the sealing body can be regarded as a replacement part, which can be replaced when it is deemed to have been consumed, e.g. because the slot has been widened too much because of wear from the saw blade. Exchange of sealing body may as a rule be made e.g. at the same time as when the saw blade is replaced. Whether the slot in the sealing body is prepared in advance or is made in situ in the sealing body it is, when the sealing body is accommodated in the cover device, positioned in the region between the upper slot in the top member of the cover device and the bottom slot in the base plate of the cover device. It is also a typical feature that the slot in the sealing body is essentially narrower, preferably several times narrower than the slots in said upper member and base plate, respectively.

The sealing body has another purpose besides preventing too much flow of air through the cover device, namely to define the front limit of the terminal chamber. The sealing body has, according to a preferred embodiment, essentially the same length as the said front chamber in the cover device, said front chamber extending from the front end of the cover device rearwards to the terminal chamber, said sealing body, at least essentially contacting the inner surfaces of the top member, the side walls and the base plate, essentially filling up the front chamber when it is accommodated therein. On the other hand, it is not convenient if the saw blade has a tight contact against the walls of the slot in the sealing body. To the contrary, it is desirable and typical according to an aspect of the invention, that there is a small gap between the saw blade and the walls of the slot in the sealing body and that the slot communicates with the terminal chamber, so that dust which the saw blade brings up into the sealing body is sucked away from the slot in the sealing body towards the terminal chamber.

According to another preferred embodiment, the sealing body which can be inserted in the cover device extends from the front end of the cover device to a position at the rear of the inlet port in the bottom of the cover device, the sealing body being provided with a through opening in the region of the inlet port.

According to still another embodiment of the invention, the cover device consists of two separate sections, which can be connected to one another, namely a rear section which includes the terminal member with terminal chamber and inlet port to and outlet port from the terminal chamber, and a front section in which the longitudinal passage for the saw blade is provided. The front section may comprise sealing members in the form of integrated parts of the front section, which sealing members almost contact the surfaces of the saw blade inside of the peripheral part of the saw blade, when the saw blade is accommodated in the longitudinal passage, so that the air flow through the passage is significantly restricted. Suitably, the front section consists of a unit made as a single piece, preferably a plastic body. The front section itself defines a sealing body providing the desired restriction of the airflow through the passage for the saw blade. According to the embodiment, the bottom surface of the front section and the bottom surface of the terminal member lie in the same plane, when the two parts are united such that they in combination define the bottom surface of the cover device. It is convenient to provide the inlet port to the terminal chamber in the bottom of the terminal member. The passage in the front section/the sealing body for the saw blade can suitably communicate with the terminal chamber when the front section is connected to the terminal member in order to guarantee a desired cleaning of said passage when the saw blade is in operation. The front section and the terminal member can be connected with one another by means of any suitably coupling, suitably a quick coupling, e.g. some kind of snap lock coupling or the like. Also according to this embodiment, when the front section itself forms a sealing body, the passage for the saw blade has a widened, central part, which can accommodate those driving discs which are provided, one on each side of the saw blade, when the saw blade is entered maximally in said slot in the sealing body/front section of the cover device.

The widened sections, which define recesses in the sealing body/the front section of the cover device, extend from the top surface of the sealing body/the front section down to a certain depth. If the driving discs constitute elements of the cutting and dust collecting assembly which set the limit for the maximal sawing depth, the recesses in the sealing body which provide said widening of the slot in the sealing body, should extend all the way down to the bottom surface of the sealing body in order not to further reduce the sawing depth. It is true that this may increase the flow of air through said passage, but that increase may be tolerated and it can also be minimized by making the widened portion of the slot very short on the bottom side of the sealing body, which is readily made, because the lowest point of the driving discs is well defined. If, however, the driving discs do not set the limit for the sawing depth, the widened portions may extend down to a certain depth which is terminated at a distance from the bottom surface of the sealing body or from the front section of the cover device, respectively.

According to still another conceivable embodiment, a base plate of steel or other metal extends all the way from the front end of the cover device to its rear end and is integrated with the terminal member, while the sealing body consists of a separate member, which can be mounted on said base plate, at the same time as it is connected with the terminal member. The said base plate is, as according to the first mentioned embodiment, provided with a slot, which is included in said passage, which slot, however, is wider than the slot in the sealing body. Generally speaking, the slot in the sealing body may be designed in principally identical modes for all embodiments.

Those embodiments, where the sealing body consists of a replacement part, which can be connected with the terminal member, or with a unit consisting of a terminal member and a base plate of metal, respectively, allows a reduction of the total amount of metal in the cover device. This makes the cover device lighter, which is an advantage. It is particularly light if the whole front section is made of a single piece of plastic material, i.e. also including the wing shaped projections which widens the bottom of the cover device. Even if a part of that kind may be somewhat more expensive to manufacture than a smaller and more simple rod, as according to the first mentioned embodiment, where the sealing body is entered into a chamber in the cover device, the cost for such kind of replacement part is still almost negligible in comparison with the cost for a diamond equipped saw blade.

The inlet port to the terminal chamber from the "mini suction box in situ" in the limited section of the kerf may consist of one or more apertures in the bottom of the cover device. This design solution applies particularly when the bottom of the cover device is established by two parts which can be separated from one another; a terminal section and a front section with a sealing body. But also in the case the bottom and bottom surface of the cover device extends continuously from the front end of the cover device to its rear end, said alternative may be applicable. However, it is more convenient in this case if the inlet port to the terminal chamber consists of a section, or a more extended rear portion, of that slot which is provided in the base plate according to this embodiment. Regardless which of these alternatives that is chosen, it is however suitable that the cover device extends in the form of a portion rearwise a distance from the inlet port of the terminal chamber, in which case the bottom surface of said rear section lies in the same plane as the bottom surface of that part of the cover device which includes said passage. This arrangement contributes to the achievement of the desired underpressure in said limited section of the kerf.

Still more arrangements can be conceived for preventing air from flowing in sideways to a to high degree under the cover device, particularly in connection with working in objects having very uneven surface, e.g. brick walls, plasted walls, or other surfaces with very coarse surface structure. In such cases, an adhesive sealing strip made of a compressible material may be applied on the wall or corresponding, covering the line along which the kerf shall be made. Suitably, the strip may have a thickness of 10-15 mm and be approximately as wide as the cover device. The material can consist e.g. of foam plastic with an adhesive agent on the underside and possibly a low friction layer on the upper side. If the operator presses the cover device against the strip, at the same time as he moves the assembly forwards, the compressible material will be compressed where details project from the wall and will fill up recesses in the wall, so that the inflow of air because of wall irregularities is reduced or eliminated. One may also conceive to make the sealing strip narrower than the base plate of the cover device and to provide a groove for the sealing strip in the base plate. If said groove has a lower height than the strip, the strip will be compressed in regions of projecting portions on the wall, floor, ceiling or corresponding that shall be worked, in order to provide desired sealing effect in regions between the projecting portions according to above, at the same time as a strip works as a guide for the assembly.

Even if there is provided in the cover device a sealing body of plastic, wood, or similar material, which the saw blade can touch without causing failure or serious damages, it is nevertheless desirable that the sealing body and the slot in it remain intact. Still more important is it of course that the saw blade does not cut into more vital construction details of the cover device. This could occur if the saw blade is not maintained centered in the cover device, or if the cover device and the blade guard in which the driving unit of the saw blade and thence the saw blade itself are mounted, would start turning sideways after the assembly has been used for a period of time because of wear of exposed construction details, e.g. due to vibrations. Therefore, according to an aspect of the invention, the unit which comprises the cover device and blade guard and which together define said dust collecting unit, includes means for adjusting the position of the cover device and/or its slots relative to the saw blade and vice versa. Since the saw blade is driven by a driving shaft which is included in the driving unit, which in turn is mounted on the blade guard, said conditions more particularly imply that said means are provided to secure correct positioning of the cover device and the blade guard sideways relative to one another, so that the saw blade will adopt a central, straight position relative to the slots in the cover device. In said means are included first members provided in the first place to prevent lateral displacement of the cover device and the blade guard/saw blade relative to one another, and second members provided in the first place to prevent oblique positioning of the saw blade relative to that plane in which it is desired that the saw blade shall work. Said first members consist of the parts of the joint through which the blade guard is pivotally connected to the cover device.

The joint consists, according to the preferred embodiment, of a hinge, i.e. a joint in which movements take place only in a plane about a shaft. The joint according to the preferred embodiment further comprises a hinge head on one of the two parts which are pivotally connected with one another, i.e. on the blade guard or on the cover device, and a pair of preferably lateral hinge elements provided on the other one of the two parts, one on each side of the hinge head. The shaft extends through the two hinge elements and the hinge head provided between the two hinge elements. The hinge elements provided on each side of the hinge head preferably has the shape of ears, which have flat side surfaces which are pressed against flat side surfaces on the hinge head. All of the said flat surfaces are parallel with one another and with a longitudinal central line of the cover device. Further, the hinge has an axial as well as a radial (diametrical) extension, the length of which in comparison with other dimensions of the assembly are considerable, and that is particularly true as far as the diametrical extension is concerned, which is in the same order, or at the nearest in the same order as the axial extension. The axial extension is preferably at least as long as the width of the sealing body mentioned in the foregoing, or as the width of the box girder which is included in the cover device. The diametrical extension, including the diametrical extension of the flat side surfaces which contact one another, amounts to at least 50% of the axial extension, preferably to at least 75% of the axial extension. The hinge in other words is very robust and is the most important guarantor for maintaining the blade guard fixed sideways in its rear part, where the hinge is positioned. Its significant radial extension at the same time helps preventing the blade guard and hence the saw blade from being obliquely positioned relative to the longitudinal centre line of the cover device after some period of use.

In order further to ensure that the saw blade will not successively be obliquely positioned relative to the centre line of the cover device, there is provided, according to a preferred embodiment, adjustment members at a distance in front of the hinge with reference to the normal feeding direction of the assembly. These adjustment members consist of devices for adjusting the relative angular positions of the saw blade and the cover device when necessary, so that the plane of the saw blade will be parallel with the longitudinal centre line of the cover device/the slots and also for maintaining this condition thereafter. Said adjustment members more particularly consist of displacement and fixation members provided to cause the blade guard to perform a slight turning movement in order to eliminate a possible angular position of the saw blade relative to the centre line of the cover device/the slots and also to fix the blade guard and the saw blade in the correct position relative to said centre line. Different types of adjustment members may be conceived for these tasks. Devices based on the functional principle of a wedge are a conceivable type. Preferably, however, adjustment screws are employed. In order that the adjustment members, whether they consist of adjustment screws, wedges or other devices, shall have the desired effect, the blade guard ought to have an unconventional high stiffness such that it will not be deformed due to those laterally directed forces which the adjustment members exert. The blade guard therefore suitably consists of a cast body of aluminium or other light metal, or, as an alternative, that the side walls of the blade guard, or at least those parts thereof which are subjected to the forces of the adjustment members, consist of sandwich elements, or are profiled or are multi walled, or are designed in some other way in order to increase the bending strength. Also related parts of the cover device are designed so that they can withstand those pressure forces which can arise due to the action of the adjustment members.

It is mentioned in the introductory presentation of the background of the invention that it is conventional according to known technique to spray water into the kerf as the kerf is successively established, in order to bind the dust and in that way prevent it from being scattered in the environment. It is also mentioned that the slurry which is formed according to this practice creates a new problem. This is true, but it is also true that access to vacuum cleaner assemblies which could work as a vacuum source for a machine with a cutting and dust collecting assembly based on the principle that the dust shall be removed through vacuum cleaning is not available on many working sites. In some cases it can be necessary or desirable to supply water to the kerf due to authorities' decisions or from other reasons. Also such desired feature can be satisfied by means of the same assembly which according to the invention has been developed for cutting and dust collection. More particularly this is achieved therein that conduits are provided for the supply of water through the sealing body, whether the sealing body is accommodated in a chamber in the cover device or forms a front section of the cover device, which is connected or connectable with the terminal member through a narrow gap between the side surfaces of the saw blade and the side surfaces of the slot which extends through the sealing body. Suitably said conduit mouths in said narrow gaps in a region which, with reference to the longitudinal direction, is positioned in front of the centre of rotation of the saw blade. This contributes to the achievement that water, which is supplied in the narrow gaps, is moved by the saw blade, when the saw blade moves downwards in the kerf, which makes the binding of dust efficient. According to the invention, the dust collection through suction according to the principles of the invention can be combined with the addition of water.

Concerning the very cover device and the sealing body belonging to the cover device, which involve important aspects of the invention, reference is made to the description of said parts which have been made in connection with the description of the cutting and dust collecting assembly. Further, reference is also made to the accompanying patent claims which are directed to the cover device and to the sealing body, and to the following, detailed description of some conceivable embodiments.

The invention also relates to the working machine which is provided with a cutting and dust collecting assembly according to the invention. The working machine includes, in a mode which can be conventional, a driving unit with a driving motor and operating members, and consists according to the invention typically of a portable hand-held machine. The motor may be electric or hydraulic or may be of a combustion engine type. The operating members typically include a rear handle with control members and a front handle. According to this aspect of the invention, the blade guard, and the cover device which is turnably connected with the blade guard, are connected with the driving unit via said side portion of the second side wall of the blade guard, which is connected with the driving unit on one side of the driving unit in the front end portion of the driving unit, turnably about the centre of rotation of the saw blade, while the saw blade is mounted on a driving shaft which extends sideways from the driving unit through said side portion on the second side of the saw blade, said saw blade being rotatable by means of said driving shaft about said centre of rotation in the clock-wise direction, when the saw blade is viewed in a direction towards the first side of the saw blade. This means that dust and other fragments which are loosened from the working object by means of the saw blade is moved backwards in the kerf towards said limited portion of the kerf, from where it is sucked up through said inlet port into the terminal chamber and further through the outlet port of the terminal chamber towards the vacuum source.

Further aspects of the cutting and dust collecting assembly, the cover device, the sealing body, and the working machine, are apparent from the accompanying patent claims and from the following description of preferred embodiments of said devices. It shall be understood that terms like upwards and downwards, upper surface, and bottom surface, respectively, etc. refer to a cutting and dust collecting assembly with a cover device placed on a horizontal support. Further, the terms front and rear end mean the front end which is turned in the direction in which one normally will work with the machine, and the rear end, respectively, which rear end is positioned in the same end as the terminal member. The terms have been chosen in order to facilitate the understanding of the description and does in no way exclude working ceilings, vertical walls, etc.

BRIEF DESCRIPTION OF DRAWINGS

In the following detailed description of the invention, reference will be made to the accompanying drawings, in which FIG. 4 is a side view of a first embodiment of a cover device according to the invention included in the cutting and dust collecting assembly, FIG. 5 is a top view showing the cover device along the line V-V in FIG. 4, FIG. 6 is a bottom view showing the cover device along the line VI-VI in FIG. 4, FIG. 7 is a side view of a sealing rod included in the cover device, FIG. 8 is a bottom view showing the sealing rod along the line VIII-VIII in FIG. 7, FIG. 8A is an alternative embodiment of a sealing rod in a view from above, FIG. 10 illustrates the machine in operation, FIG. 11 is a side view of a second, conceivable embodiment of a cover device included in the first preferred embodiment of the cutting and dust collecting assembly according to the invention, FIG. 12 shows a front unit included in said cover device, FIG. 13 is a side view of a first unit including a terminal member and a base plate included in said terminal member, FIG. 14 is a side view of a sealing body defining a second unit which can be connected to the first unit according to FIG. 13 to define a complete cover device, FIG. 15 shows a portion of the first unit in a view XV-XV in FIG. 13, FIG. 16 shows the sealing body according to FIG. 14 from above, FIG. 17 is a side view of a cover device with conduits for the supply of water, FIG. 18 shows the device according to FIG. 17 in a view from above.

DETAILED DESCRIPTION OF THE INVENTION

Figure 1:
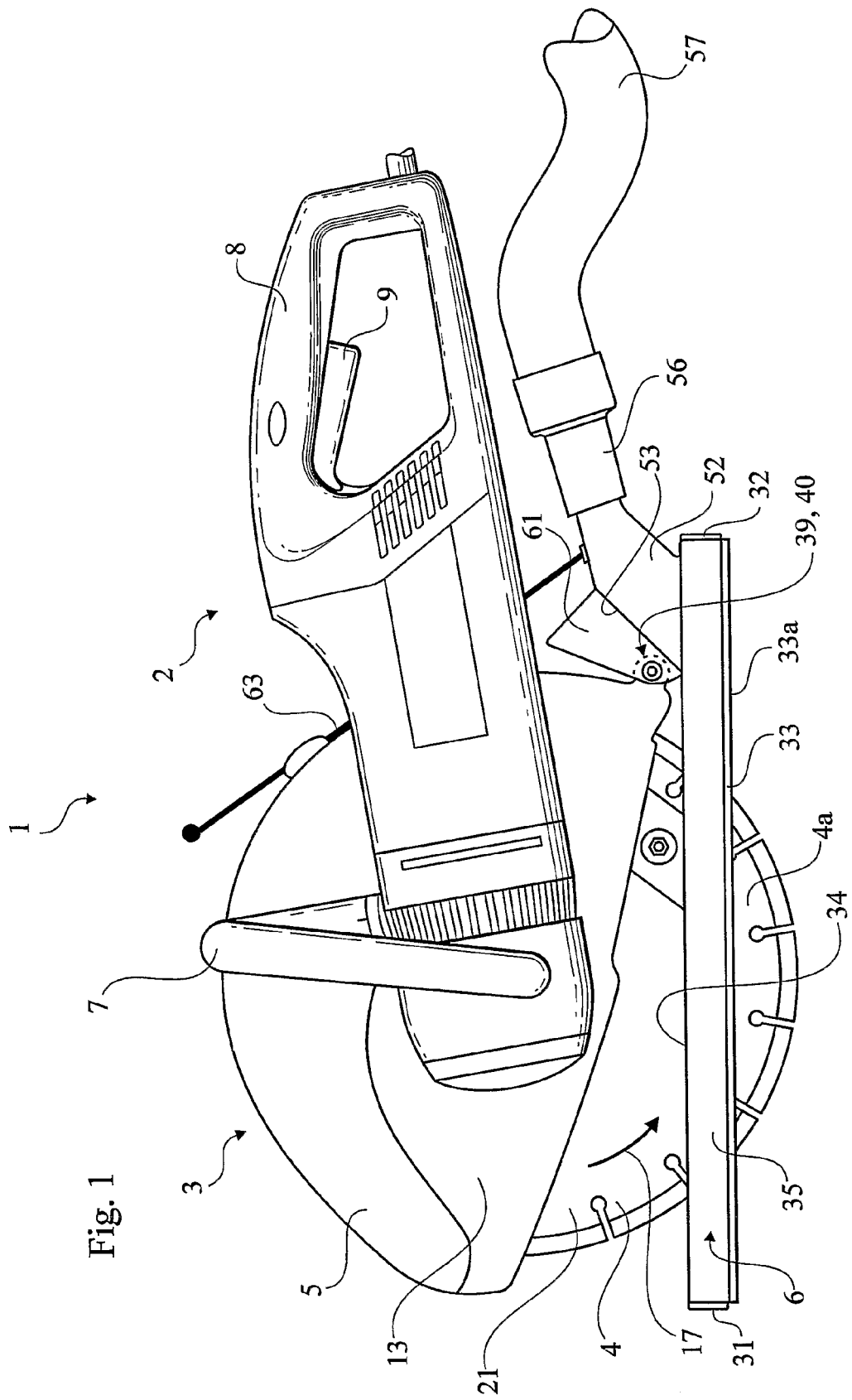
FIG. 1 is a side view of a machine according to a preferred embodiment of the invention.

With reference first to FIG. 1, a working machine according to the invention is generally designated 1. Its main parts consist of a driving unit 2 and a cutting and dust collecting assembly 3. The driving unit 2 may be of any known type, comprising an electric motor, combustion engine or hydraulic motor. According to the embodiment, the driving unit 2 is an electric driving unit of a known type, disclosed in WO 03/057395. The cutting and dust collecting assembly 3 includes a circular saw blade 4, a blade guard 5, and a cover device 6. The driving unit 2 is in a mode known per se provided with front and rear operating handles 7 and 8, respectively, a control device 9 for the electric motor, not shown, in the driving unit 2 and a driving shaft 22.

Figure 2:
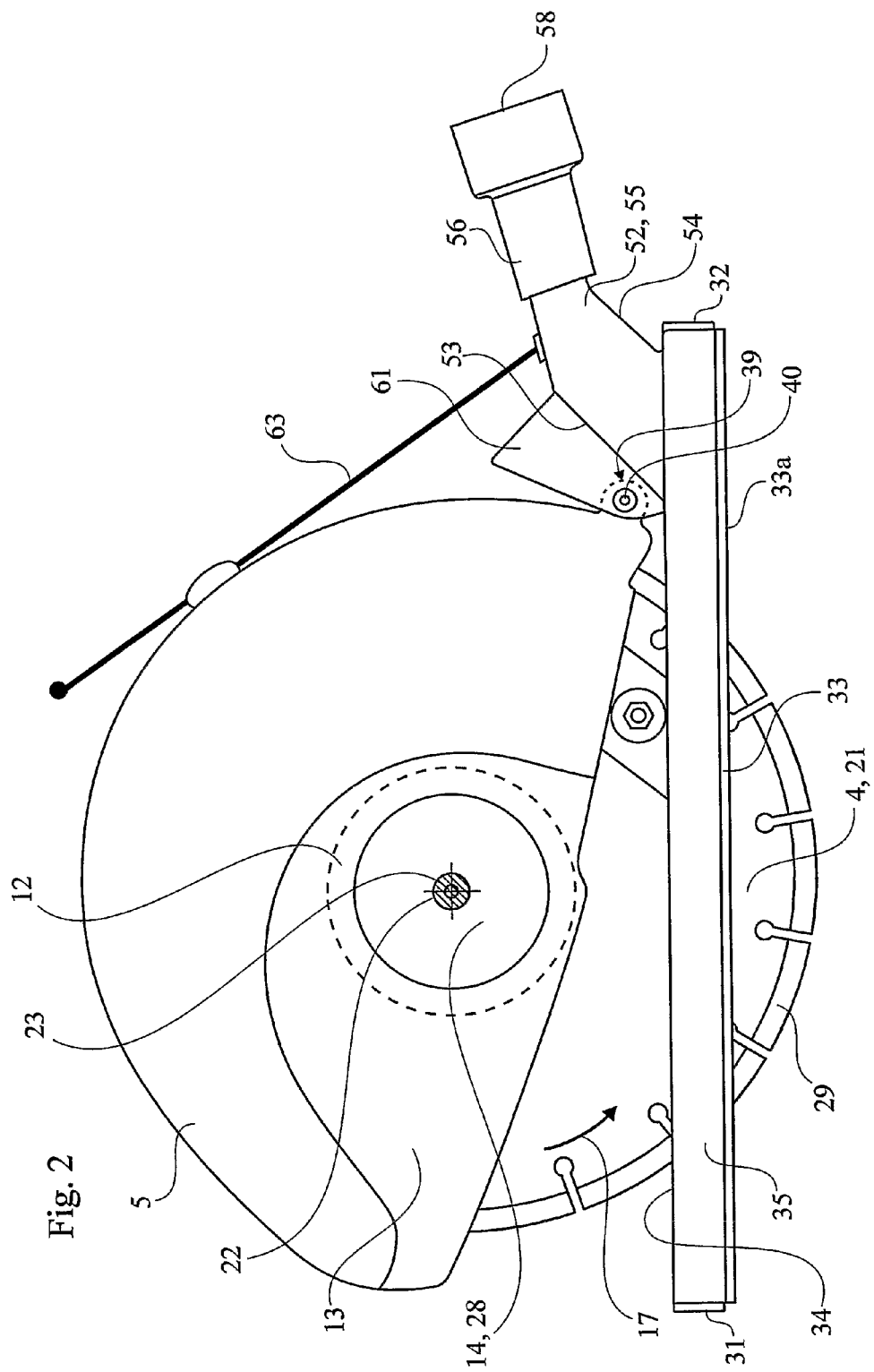
FIG. 2 shows a cutting and dust collecting assembly included in the machine according to a first preferred embodiment, in a conceived vertical section through the driving shaft of the saw blade in a plane between the cutting and dust collecting assembly and the driving unit of the machine, showing the cutting and dust collecting assembly in the same direction as the machine is shown according to FIG. 1.
Figure 3:
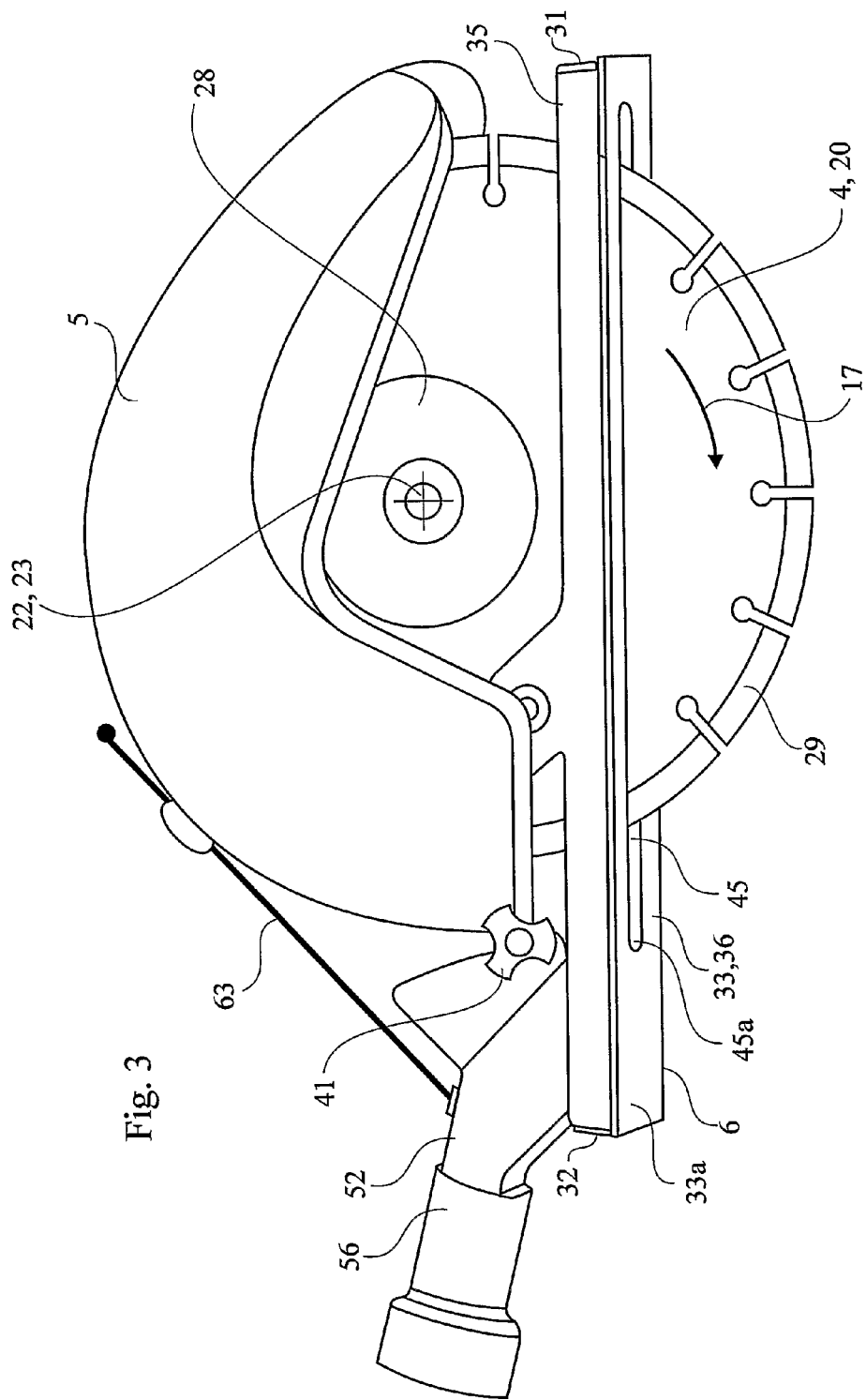
FIG. 3 is a perspective view showing the cutting and dust collecting assembly from the opposite side.

The saw blade 4 has a first side 20, FIG. 3, which is turned from a driving unit 2, and a second side 21, FIG. 2, which faces the driving unit 2. A side wall facing said second side 21 of the saw blade is designated 13. In said side wall 13 there is an aperture for the driving shaft 22 for the saw blade and means for fastening the blade guard to the driving unit in a mode allowing turning it. As mentioned, the driving shaft 22 forms a part of the driving unit 2. Therefore, per definition, it does not form part of the cutting and dust collecting assembly 3. The driving shaft 22 extends sideways out from the front part of the driving unit through the aperture 14 in the side wall 13 on the second side 21 of the saw blade. The saw blade 4 can be rotated by means of the driving shaft 22 about the axis of rotation 23 of the saw blade and of the driving shaft n clockwise direction, when the saw blade is viewed in a direction towards the first side 20 of the saw blade. An annular sliding surface 12 on the side wall 13 of the blade guard 5 directly or indirectly contacts the front portion of the driving unit 2 and is via said sliding surface 12 connected to the driving unit through friction coupling in a mode known per se, when the cutting and dust collecting assembly 3 is mounted on the driving unit 2. The blade guard 5 can be turned relative to the driving unit 2 about the centre of rotation 23 of the saw blade by mean of the front and rear control handles 7, 8, as the cover device 6 is being pressed against a work object, so that the driving unit 2 can be afforded apposition or be maintained in a position which is comfortable for the operator, independent of the position of the cover device 6. In connection herewith, said centre of rotation 23 defines a first centre of turning of the cutting and dust collecting assembly 3.

A circular driving disc 28 is provided on the first side 20 of the saw blade 4, and on the second side 21 of the saw blade an identical driving disc 28 is pressed against said side of the saw blade inside the blade guard 5, visible through the hole 14 in FIG. 2. The driving shaft 22 extends through the two driving discs which hold the saw blade 4 clamped between them. The periphery of the saw blade 4 is diamond equipped in a manner known per se. The diamond segments are designated 29.

The cover device 6 has a longitudinal symmetry line 10, a front end 31, a rear end 32, a bottom 33 (also referred to as base plate in this text) having a flat bottom surface 36, a top with a top face 34 and two elongated side walls 35 facing one another. The total length of the cover device between the front end 31 and the rear end 32 is longer than the diameter of the saw blade 4. The base plate 33 extends along the entire length of the cover device 6 between the front end 31 and the rear end 32, and its bottom surface 36 is completely flat over the entire length and width of the base plate 33, so that the entire base plate 33 of the cover device 6 can be brought in direct contact against a flat work object 15, FIG. 9. This means that no parts exist, which extend beyond the bottom surface 36, which could prevent the direct contact between the bottom surface 36 and a flat surface of a work object, which is important for the establishment of said mini suction box through efficient shrouding of the kerf that is established in the object that is being worked.

A pivotal joint 39 is provided at a distance in front of the rear end 32 of the cover device 6 at a level a short distance above the top face 34. According to the embodiment, the pivotal joint consists of a hinge, connecting the cover device 6 with a rear, lower corner of the blade guard 5. The hinge 39 includes a second centre of turning 40, which is parallel with said first centre of turning 23 and also parallel with the flat bottom surface 36 of the base plate 33. The blade guard 5 and the cover device 6 are pivotally turnable relative to one another through turning in the hinge about said second centre of turning 40.

The cover device 6 according to the embodiment can be described as a small box girder 42 with a rectangular or square cross section, extending along the entire length of the cover device and provided with a number of various building-ups. In the front part of the cover device, which embraces a little less than the total length of the cover device measured from the front end, thus a wing 43 projects at right angle from each side of the box girder 42 in the lower corner thereof. The wings 43 form integrated parts of the flat base plate 33 of the cover device, which in addition to the bottom of the box girder 42 comprises the two wings 43. The two wings 43 almost double the width of the bottom surface 36 in the region of the front part of the cover device.

The term base plate does not presuppose the existence of wings, side reinforcements or other projections at the bottom of the various spaces of the cover device. Also the very bottom itself of e.g. a box girder or the like, without any widening projections, are included in the definition of the term base plate.

A longitudinal bottom slot 25 and a longitudinal upper slot 46 extend centrally in the base plate 33 and centrally in the top 34, respectively, said top also forming the upper wall of the box girder 42. The centre lines of said slots lie in the same plane as the symmetry line 10 of the cover device. According to the embodiment, the width of the slots 45, 46 correspond to about 90% of the internal width of the box girder 42. In the longitudinal direction, the bottom slot 45 extends from a position 18 at a short distance from the front end 31 to a position 19 almost straight below the hinge 39. The upper slot 46 also extends from a position 24 at a short distance at the rear of the front end of the cover device but is terminated in a position 25 at a short distance in front of the hinge 39. This means that the bottom slot 45 extends rearwise somewhat longer than the upper slot 46. The saw blade 4 can be moved through the slots 46, 45 and hence through the cover device 6 in a mode which will be described more in detail in the following. The length of the upper slot 46 is slightly longer than the length of the chord that is projected on the saw blade 4 by the top face 34 of the cover device 6, when the saw blade 4 is maximally entered into the cover device.

At the rear of the bottom slot 45, between the rear end of the bottom slot 45 and the rear end 32 of the cover device 6, the bottom surface/base plate 33 has a flat, terminating section 33*a*, which is not penetrated by any apertures or slots. The rear end 32 is closed by means of a plastic plug 50. Above the terminating section 33*a* of the base plate there is thus a terminating space 49 defined by a rear portion of the box girder 42. Said rear space 49 extends approximately from a position under said rear, second centre of rotation 40 in the hinge 39 to the rear, closed end 32, FIG. 10A, of the cover device and the box girder 42.

The space 49 forms part of a major chamber, in the following termed terminal chamber 60, which also includes an upper space 51 on top of the box girder 42. The spaces 49 and 51 in combination form said terminal chamber in a terminal member 52, in which there is no partition between the lower and upper spaces 49 and 51, respectively, of the terminal member. Between the lower space 49 and the upper space 51 of the terminal member 52, there is thus an opening 48 in the top member 37 of the box girder, which allows free passage in the vertical direction. The upper space 51 of the terminal member 52 is limited by a front wall 53 which slopes backwards and a rear wall 54 which also slopes backwards, and two parallel side walls. In its upper portion, the terminal member 52 forms an angle obliquely upwards rearwards and is terminated by a connection portion 56 for a dust suction hose 57.

Said rear portion 33*a* of the base plate 33 of the cover device 6 extends rearwise at a distance from the inlet port 45*a* of the terminal chamber. The bottom surface of this rear portion 33*a* lies in the same plane as the bottom surface 36 of the main part of the base plate, which comprises the bottom slot 45. As should have been apparent from the foregoing, and as also is shown in the drawings, the base plate 33 and its flat bottom surface 36 have a length which is significantly larger than the chord which is defined by the projection of the base plate on the saw blade, when the saw blade is inserted to its maximal working depth in the work object 15. The portion 33*a* in this connection forms an additional extension of the section of the formed kerf which is covered by the flat bottom surface 36 of the base plate.

Two upright ears 61 are provided on the front wall 53 of the terminal member 52 and between the ears a transversal bar 62. Said ears 61 and bar 62 define a rear end stop for the rearwise directed rotational movement of the blade guard 5 about said second centre of turning 40. A pullback spring for returning the blade guard 5 to a rear resting position against the support 61, 62 is designated 63. According to the embodiment, said pullback spring consists of a rubber strap. It should be understood that also many other devices can be employed for this function, e.g. a coil spring in direct connection to the hinge 39.

As has been mentioned above, the terminal chamber 60 has an inlet port the mouth of which coincides with the plane of said bottom surface 36. The inlet port is located in a portion of the bottom surface 36 at the rear of the hinge 39. According to the invention, the inlet port consists of a rearmost portion 45*a* of the bottom slot 45 in the base plate 33. An outlet port 58 from the terminal 60 is provided in the rear end of the connection portion 56.

The invention is not restricted to the use of a saw blade 4 having a specific diameter or thickness. Normally, however, the saw blade has a diameter of between 200 and 1000 mm at the same time as the central part of the saw blade, i.e. the blank which makes the main part of the blade and which is provided with diamond segments around its periphery, typically has a thickness amounting to 2-5 mm. The diamond segments 29 may be about 0.5-1 mm thicker. For example, a saw blade 4 having a diameter 300 mm may have a central part with a thickness of about 2 mm, while the thickness of the diamond segments in that case amounts to about 2.5 mm. It should be understood that a saw blade having these dimensions, working in reinforced concrete and similar materials, is subjected to severe stresses which may cause vibrations and high sound levels. In order to reduce these effects, a pair of vibration dampers 66 are provided, one on each side of the saw blade.

The vibration dampers 66 are provided in a pair of holders, which project obliquely rearwards, up from the upper surface 34 of the cover device 6. The vibration dampers 66 consist of a pair of blocks of a wear resistant material, for example of the same type that is used in certain break shoe linings and can be pressed against the respective side 20, 21 of the saw blade 4 with a convenient power by means of adjustment screws 68. At the same time as they are vibration dampers, the blocks 66 in combination with the adjustment screws 68 also function as centering devices for centering the cover device 6 relative to the saw blade, so that the plane of the saw blade will remain parallel with and essentially coincide with the symmetry line 10 of the cover device.

But even if vibrations of the saw blade 4 can be reduced to a considerable degree by means of the vibration dampers 66, vibrations can not be avoided completely. Moreover, the centering of the saw blade in the slots 45 and 46 can not be guaranteed by means of the vibration dampers/centering devices. In order to avoid contact between the saw blade 4 and the edges of the slots 45 and 46, the slots therefore has a width which is several times larger than the thickness of the saw blade. The width of the upper slot 45 also allows the driving discs 28 to be entered into the box girder 42, when the saw blade is moved maximally downwards through the cover device 6.

Figure 10A:
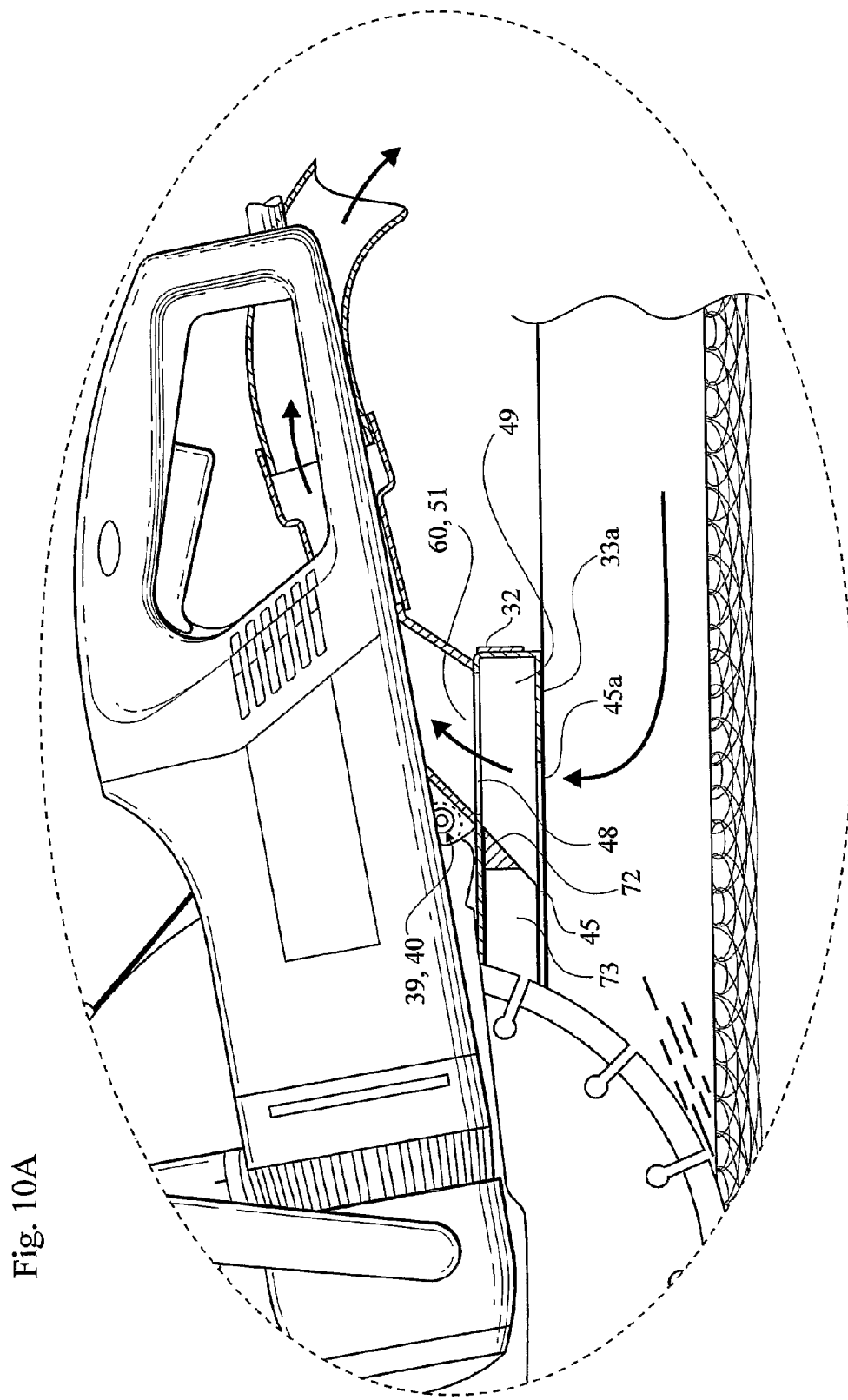
FIG. 10A shows encircled details in FIG. 10 at a larger scale.
Figure 19:
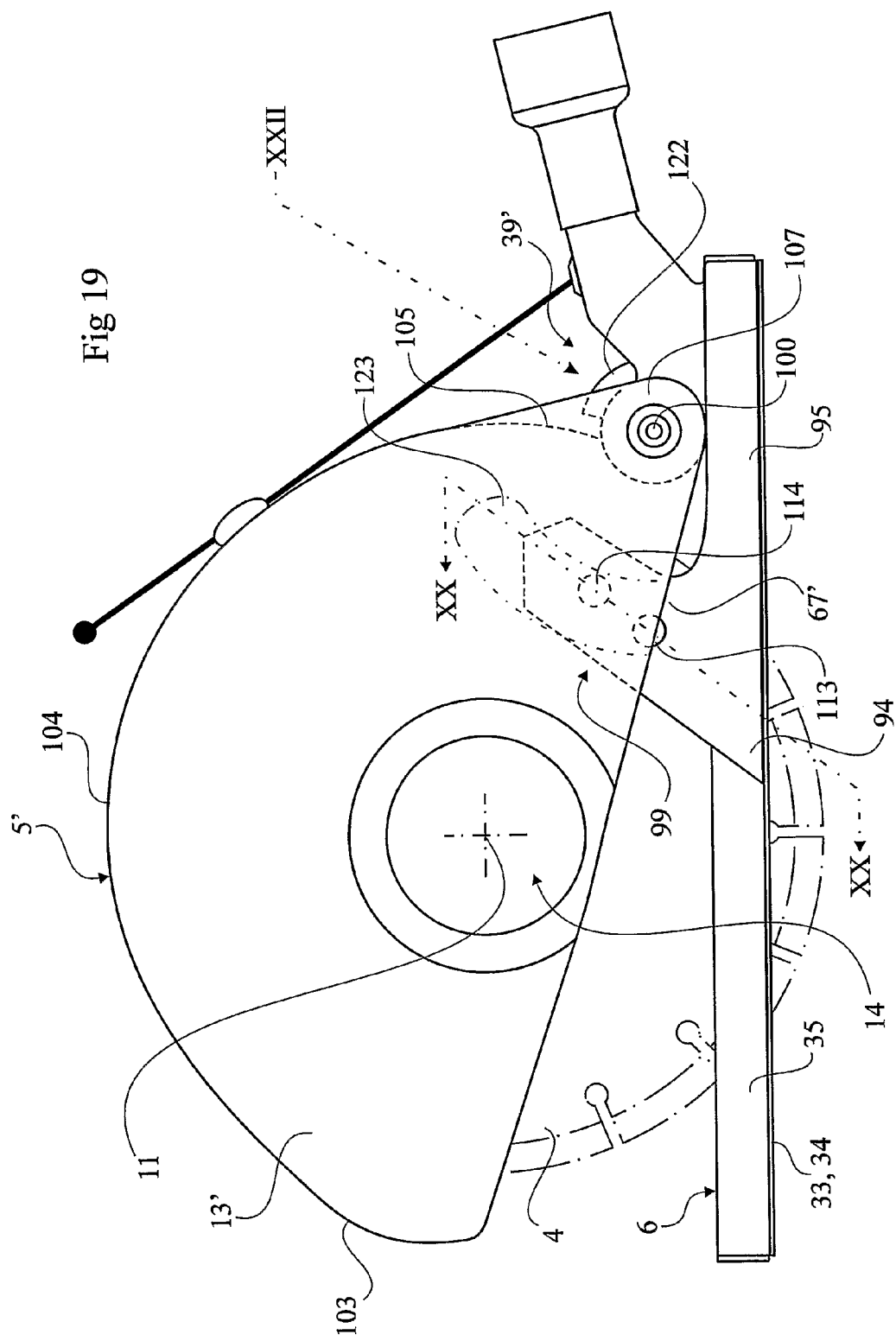
FIG. 19 is a left hand side view of the unit included in the cutting and dust collecting assembly defining a dust collecting unit in the assembly according to a second preferred embodiment of said unit, the saw blade which shall be included in the integrated assembly being indicated through ghost lines.
Figure 20:
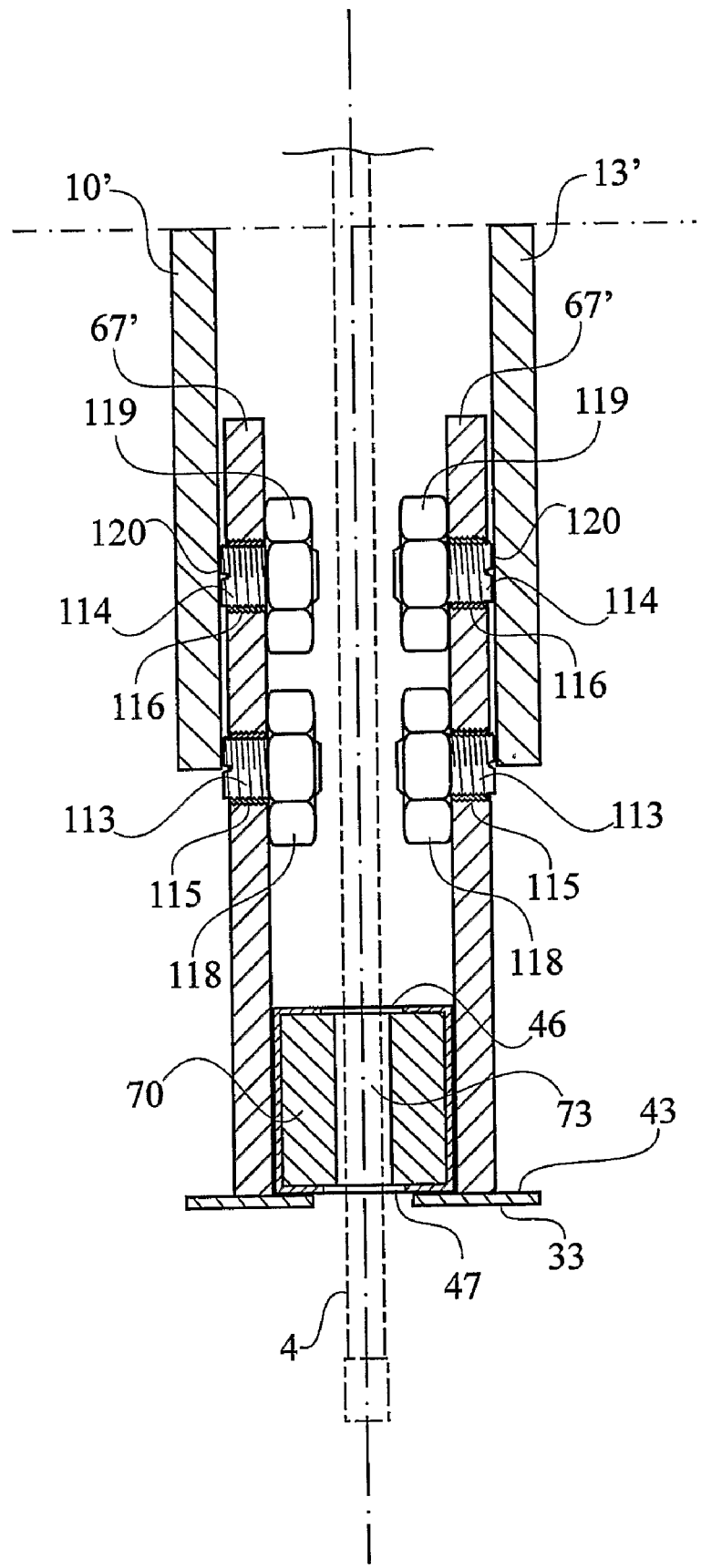
FIG. 20 shows a blade guard included in the dust collecting unit from the left.
Figure 21:
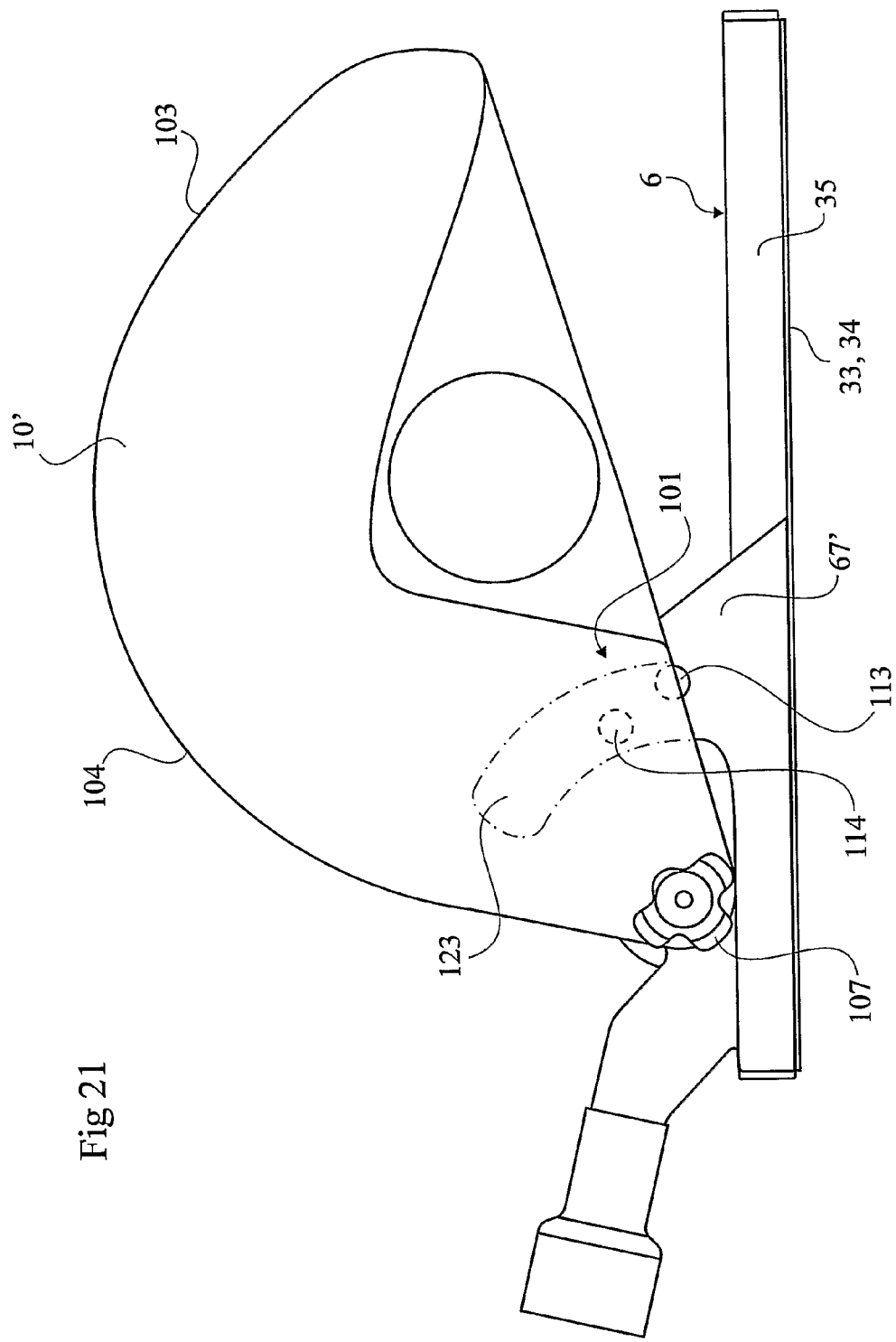
FIG. 21 shows the dust collecting unit in a view along the line XXI-XXI in FIG. 19.

It is mentioned in the introductory disclosure that the cutting and dust collecting assembly according to an aspect of the invention comprises a cover device which satisfactorily restricts the passages for air at the sides of the saw blade. For this achievement, the box girder 42, according to an aspect of the invention, contains a sealing rod 70 of a stiff plastic material, said rod having a cross section of the same shape as the inner cross section of the box girder 42. The sealing rod 70 is entered from the front end into the box girder 42, in which it is fixed with its front end portion, which is wedged into the front mouth of the box girder in the region of the front end 31 of the cover device 6. Only a head portion 71 projects in front of the mouth. The sealing rod 70 extends from the front end 31 rearwise to about a position at the rear, second centre of turning 40. The rear end 72 of the sealing 70 is obliquely cut, FIG. 7, FIG. 8, and FIG. 10A. The consequently sloping surface in the end 72 extends in the same plane as, or is inclined still a little more than the front wall 53 of the terminal member 52, or slightly in front of said plane. The terminating section 45A of the bottom slot 45 is indicated in FIG. 4 and FIG. 10A and extends beyond the lower edge 75 of the rear end 72 of the sealing rod 70.

Figure 9:
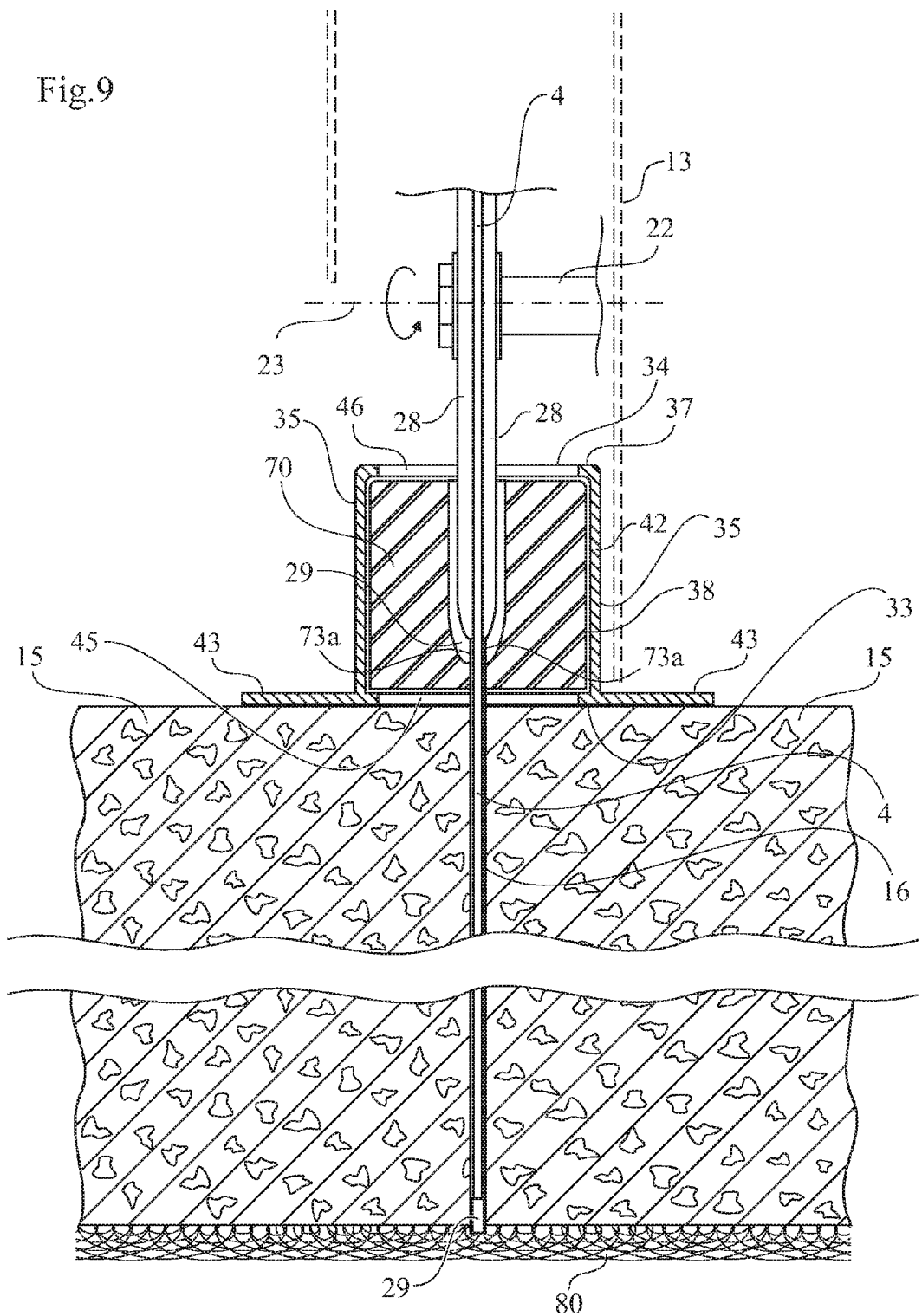
FIG. 9 shows parts of a front section of the cover device and a portion of a working object in cross section.

A longitudinal slot 73 extends through the sealing rod 70 between its upper surface and its bottom surface. The slot 73 is only slightly shorter than the rod and extends from a position 76 at a short distance inside of the head portion 71 in the front end to a position 77 at a still even shorter distance from the rear edge 78 of the rod 70. As a matter of fact, the slot 73 extends all the way to approximately the centre of the sloping rear end 72. This means that the slot 73 communicates with the terminal chamber 60, which is important, which will be explained in the following. At the centre of the rod 70, the slot 73 is widened from the upper surface of the rod down to a certain depth. Preferably, the widened portion 74, however, does not extend all the way down to the bottom surface of the rod 70, Fog. 9. The widened portion 74 is intended to receive and to accommodate the driving discs 28. This is illustrated in FIG. 9, which shows the cover device 6 partly schematically in a section of the region of said widened portion 74. As far as the depth and the extension in the longitudinal direction of the widened portion in its deepest part is concerned, reference is also made to the discussion in the foregoing description of the invention concerning these conditions. The rear parts of the cover device and the centering members are not shown. On the other hand, the positions of the walls of the blade guard 5 have been shown through ghost lines. Thus it is shown that the side wall 13 of the blade guard 5 is positioned so far from the vertical centre plane of the saw blade that said wall 13 will not touch the box girder 42, even if the blade guard 5 is moved maximally downwards. Instead it will be positioned at the side of the longitudinal side 35 of the box girder which faces the driving unit 2. This is also indicated in FIG. 10.

Initially, the slot 73 has a width corresponding to the width of the working, peripheral, diamond equipped portion of the saw blade, i.e. in the order of 2.5-3 mm. The sealing effectuated by the sealing rod 70 against the walls of the box girder 42 and against the side surfaces 20, 21 of the saw blade 4 is initially good but not complete. Nor is that desired. Thus, there is a thin gap 73a between the main part of the saw blade inside—with reference to the radial direction—the peripheral working part. Successively, however, the sealing rod 70 is subjected to wear by the saw blade 4, which widens the slot 73 and said gaps 73a. The sealing rod 70, however, is an article of consumption, which is cheap in comparison with the saw blade 4 and can be replaced as soon as its sealing function no longer is considered to be satisfactory. Suitably, replacement is performed in connection with replacement of the saw blade. When the saw blade 4 shall be replaced, the cover device 6 is first unfastened from the blade guard. This is carried out by pulling out the pin shaped shaft in the hinge 39 by means of a handle 41. Then the saw blade 4 can be demounted in a conventional way by undoing the bolt or nut which in a conventional mode keeps the saw blade clamped on the driving shaft between the driving disks 28. When this has been carried out, the consumed sealing rod 70 is pulled out from the front and is replaced by a new one. Several modes are conceivable to prevent that the sealing rod 70 is turned the wrong way in connection with supplying a new rod. One conceivable mode is to design the cross section of the box girder and the rod such that erroneous turning is prevented. Another mode is to provide an end stop on the inner side of the base plate 33 preventing the rod 70 from being inserted completely if it were turned the wrong way around.

The intended mode of operation of the machine 1 with its cutting and dust collecting assembly 3 is as follows. The machine 1, FIG. 1, is brought with the bottom surface 36 of the base plate 33 of the cover device 6 tightly contacting the surface of the work object, e.g. a floor, a wall, a block of concrete, or the like. Through manipulation by means of the front and rear handles 7 and 8, respectively, of the driving unit 2, the saw blade 4 is moved down into the work object 15. As the saw blade 4 is moved downwards in the upper slot 46, the slot 73 in the sealing rod 70, and the bottom slot 45, successively forms a kerf 16 in the work object 15. The blade guard 5 comes along in this movement, wherein it is turned about said centre of turning 40 relative to the cover device 6, the base plate 33 of which is pressed against the surface of the work object 15 which stretches the return spring/rubber strap 63. When the saw blade 4 has reached its maximal depth, FIG. 10, the driving disks 28 are inserted in the recesses 74, i.e. in the widened portion of the slot 73 in the sealing rod, and the side wall 13 of the blade guard contacts or at the nearest contacts one of the wings 43, which are included as projections on the base plate 33. The wings 43 have quite a small thickness—the order of 1-1.5 mm—which means that the reduction of the maximal depth of penetration of the saw blade into the work object is negligible. When the operator eases the force that he applies on the handles 7, 8, the blade guard 5 and hence the saw blade 4 returns to the starting position by means of the return spring/rubber strap 63.

Normally an experienced operator does not work down to full depth in one step but performs the work through two or more sawing operations until the desired depth has been achieved. In FIG. 9, a kerf made to full depth is designated 16 in FIG. 9 and FIG. 10A, while a semi-finished kerf is designated 16a in FIG. 10A. At the same time as the saw blade 4 in this mode is brought deeper and deeper down into the work object 15, the blade guard 5 on one hand is turned relative to the driving unit 2 of the machine about said first centre of turning 23 (which coincides with the centre of rotation of the saw blade), so that the driving unit 2 of the machine consistently is maintained in a position which is desired from an ergonomical point of view, and on the other hand relative to the cover device 6 about said second centre of turning 40 in the hinge 39 adjacent to the rear, lower corner of the blade guard 5. The direction of rotation of the saw blade is indicated by the arrow 17 in FIG. 10. The saw blade 4 thus cuts its way into the work object 15 as the machine 1 is moved forwards.

The space in the box girder 42 consists of a front space or chamber 38 and of the terminating, rear space 49, which forms part of the terminal chamber 60. The sealing rod 70 is entered into the front space 38 from the front end and it essentially fills up said front space, which extends to the rear space 48 which forms part of the terminal chamber 60, so that the rear, sloping end surface 72 of the sealing rod will form part of the walls of the terminal chamber. The terminal chamber 60 thus is limited by the following walls or surfaces of various objects:

The sloping rear end 72 of the sealing rod 70

Those parts of the base plate 33 which are localized to the region behind the sealing rod 70

The longitudinal sides 35 of the box girder 42
The plug 50
The inclined front wall 33 and the inclined rear wall 54
The side walls 55
The inside of the connection part 56

To the thus defined terminal chamber 60 there is an inlet port, which according to the embodiment consists of said rear end portion 45a of the bottom slot 45 in the base plates 33. Said inlet opening 45a constitutes the quite dominating inlet to the terminal chamber. Besides, some minor leakages occur, which provide what may be termed leakage flows, which however are desired. Thus some air flows into the terminal chamber 60 from the slot 73 in the sealing rod, passing the sloping rear end 72 of the sealing rod. This flow of air conveys dust which has not been thrown rearwise by the saw blade in the established kerf, but which is conveyed by the saw blade 4 during the rotation thereof. Also some inflow of air takes place between the bottom surface 36 of the base plate and the work object, which prevents dust from being spread that way to the surrounding.

The terminal chamber is in direct connection with that section of the kerf 16 which at every moment is localised to the region under the base plate 33, through the inlet port which is defined by the rearmost section 45a of the bottom slot 45 in the base plate 33 of the cover device 6. The section of the kerf immediately under the inlet port 45 is satisfactorily sealed in the front direction by the saw blade 4 itself and upwards, and a distance rearwards measured from the saw blade 4, by the base plate 33 and by the sealing rod 70. In the kerf 16, which in itself is comparatively narrow—in the order of 3 mm—therefore, in the region immediately behind a present region of operation of the saw blade, as well as in the region of the saw blade itself, an underpressure is maintained relative to the air pressure of the surrounding environment. A "mini suction box in situ" is established in the kerf 16. The saw blade throws the major part of the material that has been released from the work object towards said region of the kerf 16 behind the saw blade 4—towards the mini suction box—. Said underpressure is sufficient for preventing the loosened material from spreading to the environment, although it may consist of a fine dust. Instead it is efficiently sucked up through the inlet port/the rear portion 45a of the slot 45 in the base plate 33 at the rear of the sloping rear wall 72 of the sealing rod 70, up into the terminal chamber 60 and from the terminal chamber further on through the outlet port 58 and the evacuation hose 57 to the vacuum source. Air which has been sucked up together with the dust from the kerf 16 and which flows up into the terminal chamber 60 and further through the evacuation hose, is substantially replaced by air flowing forwards through rear sections of the kerf 16 and which conveys remaining dust which may exist in these parts of the kerf, while minor flows, as has been mentioned above, occur through the cover device 6 and between the base plate 33 of the cover device 6 and the surface of the work object 15.

The wall may in a neighbour room be covered e.g. by a strand 80 of foamed plastic in a region where the wall will be penetrated by the saw blade, in order to prevent that dust is spread to said neighbouring room, when the kerf 16 penetrates the wall or the floor, as the case may be. This has been illustrated in FIGS. 10 and 10A. Also other means can be applied on the wall in the same purpose, e.g. a board or the like. 4

FIG. 8A shows another conceivable embodiment of the sealing rod, which is designated 70a in FIG. 8A. According to the embodiment, the rod 70a has the same length as the box girder 42. In the conceived case, the rod 70a is inserted from the rear end of the box girder 42. In its rear end, the rod 70a therefore has a widened end portion. The rod, however, may as well be inserted through the front end, which therefore in a corresponding mode is provided with a widened portion, as was the case for the sealing rod 70 according to the first embodiment. What characterises the sealing rod 70a is, besides its length that its rear portion has an opening 79, which as a matter of fact forms part of the terminal chamber 60.

FIGS. 11 and 12 show a cover device 6' consisting of a front member 82 and a terminal member 52'. The two members 82 and 52' can be connected to one another to form a unit. For example, the rear end of the front member 82 may be provided with a pair of projections 83 which are inserted into recesses in the sides of the terminal member 52' and be fixed there, e.g. through a snap lock or in some other mode. In the bottom of the terminal member 52, there is provided an inlet port to a terminal chamber in the terminal member 52'. The inlet port 84 has been indicated in FIG. 11 only schematically.

The front member 82 consists of a single piece of a very strong, durable and shape permanent plastic material, which conveniently is fibre reinforced. Basically, it has the same shape as the front section of the cover device 6 according to the previously described embodiment. The difference is that the front member 82 in this case consists of a single piece, the sealing rod constituting an integrated part of the unit, which is provided with integrated bottom wings 43'. The front member 82 in other words consists of a plastic rod with the same shape as the front section of the cover device 6 of the foregoing embodiment. In this plastic rod/front member 82 there is provided, as according to the previous embodiment, as slot 73 for the saw blade 44, including a widened portion 74 for the driving discs 28. The cover device 6' optionally may be provided with centering devices, in principle in the same mode as according to the previously described embodiment. However, also other devices or measurements for solving possible centering problems are conceivable, for example the problem solution which shall be disclosed in connection with next embodiment.

Next embodiment is described with reference to FIGS. 13-16. In this case, there is employed a sealing rod 70' of a hard plastic material, which is provided with a central recess 74', adapted to accommodate the driving discs 28. Any slot is in this case not provided in the sealing rod 70'. The intention is to establish the slot by means of the saw blade 4 as an initial measure in connection with the mounting. Before this step is taken, the rod 70' is mounted on the base plate 33', more specifically on a front portion of the base plate, which extends forwards from a terminal member 52". The terminal member 52" in other respects is designed in principle in the same mode as the terminal member 52' above, including an inlet port 84 to the terminal chamber, which is not shown, but which exists in the terminal member 52". The sealing rod 70' can be mounted on the base plate 33' from above and be fixed by means of a snap connection. Further, two pairs of support 89, which project upwards, may be provided in matching recesses 91, which fix the sealing rod 70' in a correct position over a longitudinal slot 45' in the base plate. The base plate 33' has the same width as according to the previous embodiments, which means that portions of the base plate form wing-shaped projections on each side of the mounted rod 70'. As has been mentioned in the initial part of the description, the cover device can be completed with devices for the supply of water to the gaps 73a between the side surfaces of the saw blade and the inside of the slot 73 in the sealing rod 70. This is illustrated in FIGS. 17 and 18, where those parts of the supply conduits, which extend through the sealing rod, are designated 86. Tubular conduits 87, which extend along the outside of the box girder 42 are connected to the channels 86. A common connection 88 is provided at the rear end.

In FIG. 19, FIG. 20, FIG. 21, and FIG. 22, details which have the same or essentially the same design as disclosed in the previous drawings, have been afforded the same reference numerals as in those drawings, while other details, which have correspondences in those drawings, but the design of which are significantly different, have been afforded the same reference numeral with the addition of '. Thus for example the holders, the hinge, and the blade guard are modified in comparison with corresponding parts according to the previously described embodiment and have been designated 67', 39', and 5', respectively.

The two parallel holders 67', which in the normal working position are projected upwards, are integrated with the cover device 6, which in other respects is un amended. More specifically, they are fastened through welding to the outer surfaces 35 of the box girder 42, or are integrated with the box girder in some other mode at a significant distance from the slots 45 and 46. Each of the holders 67' has the shape of an arrow point-like plate having the point 94 pointing downwards-forwards, a first wing 95 mounted against an outer surface 35 of the box girder and against a respective wing 43 of the base plate 33, and a second wing 96, which extends obliquely upwards-rearwards from the point 94. Each holder 67' has a thickness corresponding to the width of the respective wing 43 and consists of a homogenous plate of aluminium or other light metal, which in combination with the substantial thickness, afford an adequate bending strength in lateral directions to the holders, which is an important feature. The cover device 6 also suitably consists of aluminium or other light metal.

Figure 22:
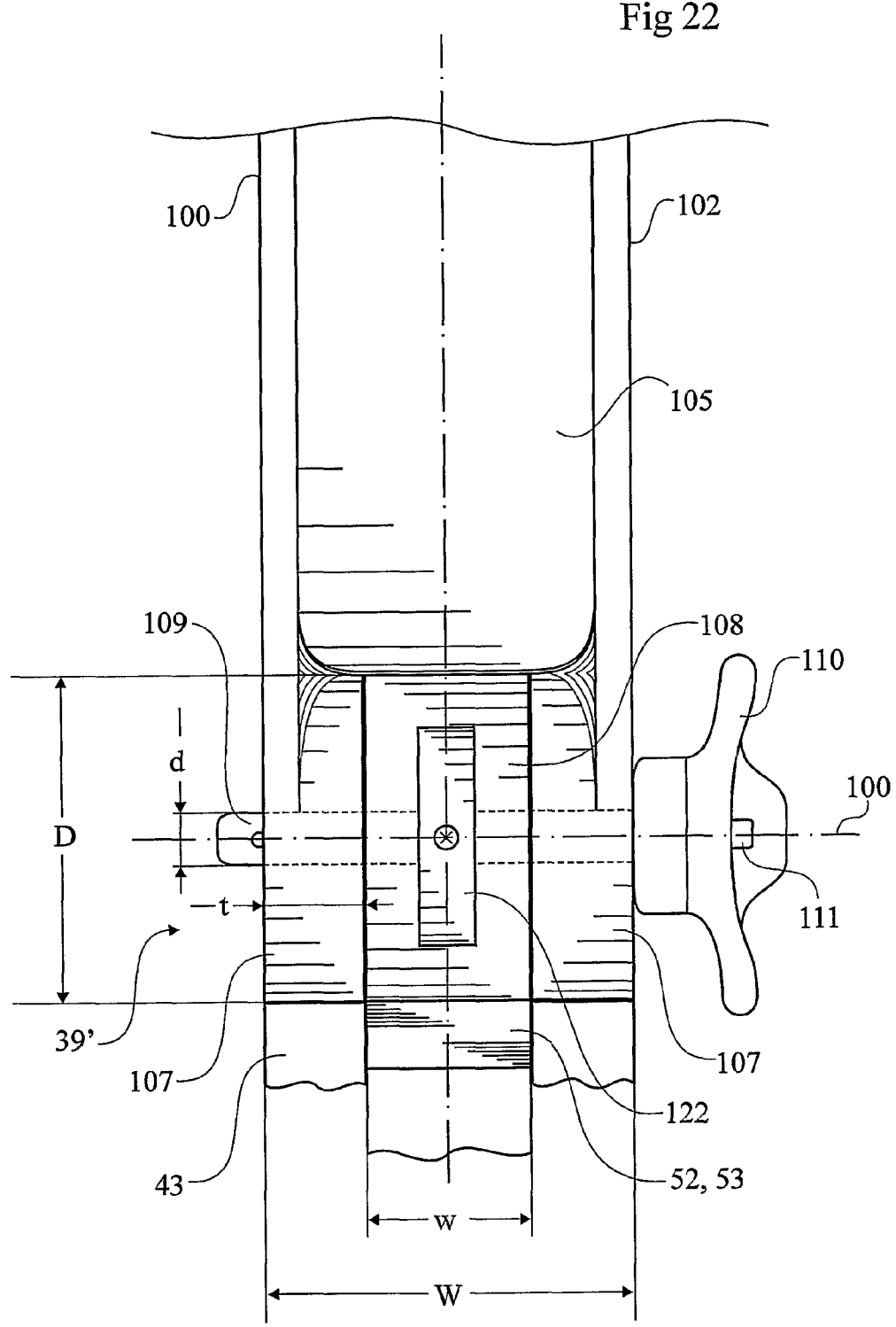
FIG. 22 shows a hinge included in the dust collecting unit in a view indicated through the arrow XXII in FIG. 19.

Also the blade guard 5' consists of aluminium or other light metal. In the cutting and dust collecting assembly according to the invention, the blade guard is not only a guard for the blade and forms part of the dust collecting unit; it also forms a link between the cover device 6 and the saw blade 4 therein that the driving unit 2 of the saw blade is attached to the left hand, first side wall 13'. At least the main part of the region 99 of the left hand side wall 13' of the blade guard between the hole 14 for mounting the driving unit and the hinge 39' and a corresponding region 101 of the right hand, second side wall 10', are so robust that they can resist significant, laterally directed forces without being deformed. Instead such forces, directed in either direction, according to an aspect of the invention, will cause the blade guard 5' to be turned slightly aside in order to eliminate any existing angle between the plane of the saw blade 4 and the longitudinal centre line 10 of the slots 45, 46, and 73 in the cover device 6 and its sealing rod 70, when that is desired. The side walls 10' and 13' of the blade guard cover the two holders 67' when the blade guard 5' is lowered down against the cover device 6. According to the embodiment, the side walls 10', 13', or at least the regions 99 and 101, are comparatively thick, which affords them a desired resistance to deformation. More specifically, the side walls of the blade guard 5' at least in said regions 99 and 101 have a thickness in the same order as the thickness of the holders 67'. The front 103, the top portion 104, and the back portion 105 of the blade guard connect the two side walls 10' and 13'. A terminating section of the back portion 105 is shown in FIG. 22 and it has also been indicated through ghost lines in FIG. 19.

The lower corners of the side walls 10', 13' form ears, which are included as lateral outer hinge elements 107 in the hinge 39'. The joint elements/ears 107 have flat side surfaces and a thickness (t) which is larger than that of the side walls 10', 13'. A hinge head 108 having a substantially circular cylindrical shape is provided between the lateral hinge elements 107, extending forwards-upwards from the cover device in the region of the transition between the upper surface of the cover device 6 and the sloping front side 53 of the terminal member 52. Its extension (D) in the radial direction is at least three, preferably at least four times as large as the thickness (t) of the lateral joint elements/ears 107. Its flat side surfaces contact the corresponding, flat side surfaces of the lateral hinge elements. The width (w) of the hinge head, i.e. its extension in the axial direction, corresponds to at least twice the thickness (t) of the ears 107. The total axial length (W) of the hinge 39' corresponds to the width of the cover device 6, including the bottom wings 43. A shaft 109, having a handle 110 in one end, extends through holes in the hinge elements 107 and in the hinge head 108. The shaft 109 can readily be released by means of a quick coupling device of a design known per se, which is manipulated by means of a pin 111, which can be pressed inwards in the centre of the handle, whereupon the cover device can be demounted from the blade guard and hence from the cutting and dust collecting assembly. Assembling is carried out in an analogue manner by means of the said quick coupling.

The blade guard 5' can be turned about the axis of rotation 100 of the hinge 39'. Said axis 100 of rotation of the hinge 39' is parallel with the axis of rotation 11 of the saw blade 4. A stop lug 122 limits the turning upwards-rearwards. The described design of the hinge 39' prevents the hinge head 108 and hence the cover device from being displaced in the axial direction of the hinge 39' because of forces which the assembly normally can be subjected to. The significant radial extension of the hinge 39', because of its large surfaces of contact, at the same time implies that the pressure, which the contacting surfaces of the lateral hinge elements 107 and the hinge head 108 exert against one another, will be comparatively low. This also means that the wear will be insignificant, which in tern counteract the formation of play in course of use; in other words that the hinge head 108 may maintain its original position between the lateral hinge elements with good precision, in spite of intense and long term use of the assembly. At the same time, the undesired oblique position of the saw blade 4 relative to the cover device 6 is counteracted as has been mentioned in the foregoing.

Oblique position of the saw blade 4 relative to the cover device is also counteracted by the holders 67', which extend up into the interior of the blade guard 5', if the holders 67' directly or indirectly contact the inside surfaces of the side walls 10', 13' of the blade guard, provided the inside surfaces of the side walls have a harmonised design. According to the preferred embodiment, such indirect contact is performed via adjusting members 113 and 114. A pair of such adjusting members contact each side wall 10', 13' on the inside surface of the respective side wall. According to the embodiment, each adjusting member 113, 114 consists of an adjusting screw in the form of a treaded, headless cylindrical stud, which is screwed into a threaded through boring 115, 116 in the respective holder 67'. The adjusting screws/studs 115, 116 are made of a wear resistant plastic material, preferably a low friction plastic material, e.g. Nylon or Teflon. A contact portion 120 of the screws extend a short distance—the order of 1 mm—on the outer side of the holders, said contact portion contacting a respective inside surface of the side walls of the blade guard 5'. The said contact portion 120 is provided with a slot, Allen or Philips hole or other grip for a screw driver. On the inner side, i.e. on that side which faces the saw blade 4, a locking nut 118, 119 is screwed on a piece 121 of the respective screw 113, 114 projecting in that end.

The contact portions of the adjusting members/adjusting screws 113, 114 contact the respective side wall 10', 13' within a region which is flat and the plane of which forms a right angle to the axis of rotation 100 of the hinge 39'. This also implies that the flat region in question of the inside surface of the first side wall 10' is parallel with the corresponding region on the opposite side wall 13'. The flat and parallel regions in principle may include the entire surfaces of the blade guard walls, which they in fact do according to the embodiment which is shown in FIGS. 19-22, but in principle it is sufficient that the flat and parallel regions, having planes which form right angles to the axis of rotation 100 of the hinge 39', consist of those regions which have been designated 123. These smallest conceivable regions have the shape of arcs of circular rings and define the location of conceivable contacts between the contact portions 120 of the adjusting screws 113, 114 and the inside surfaces of the blade guard within the possible region of turning of the blade guard 5' about the axis of rotation 100 of the hinge. When the blade guard 5' is turned about the axis of rotation 100, the adjusting screws 113, 114 thus will slide against those regions of the blade guard which forms right angle to the axis of rotation 100 of the hinge 39' and also parallel with the centre line 10 of the slots 46, 47, 73, when the blade guard has adopted the intended, correct position relative to the centre line 10.

The blade guard 5' and the holders 67' with the adjusting screws 113, 114 thus constitute an adjustable system for maintaining the saw blade correctly directed in the slots of the cover device without any angle position relative to the symmetry line of said slots and of the entire cover device 6. When the correct position has been adopted, it is maintained on one hand because the hinge 39' has a very high resistance to relative lateral displacements of the hinge members, and on the other hand because of the rigidity of the elements which are connected via the screws 113, 114, which elements include the blade guard 5' and the two holders 67' which at least in those regions which are subjected to forces have a significant rigidity as far as those parts which are subjected to forces are concerned. If however, the saw blade 4 in the course of time would adopt a certain oblique position, e.g. because of uneven wear of the contact portions 120 of the adjusting screws 113, 114, the cover device 6 is demounted by means of the said quick coupling, whereupon the locking nuts 118, 119 are eased, the adjusting screws 113, 114 are rotated to new, adjusting positions, the locking nuts are tightened to their locking positions, and the cover device 6 is reassembled with the blade guard 5'.

It should be understood that the described system of adjustment can be modified such that the adjusting members, whether they consist of adjusting screws, wedge devices or something else, are provided in the side walls of the blade guard 5' instead of in the holders 67', and are moved against or from and are pressed against and can slide against flat surfaces of the holders 67', in which case the planes of said surfaces form right angles to the axis of rotation 100 of the hinge 39'.

The invention claimed is:

1. A cutting and dust collecting assembly, comprising:
   (a) a circular saw blade having a first side, a second side, a peripheral portion defining the working part of the saw blade, and a centre of rotation,
   (b) a blade guard extending over the saw blade around at least half of its circumference, a side wall of the blade guard on the second side of the blade covering or at least substantially extending around the centre of rotation of the blade,
   (c) a cover device which is elongated in a direction perpendicular to said centre of rotation, and has a first end defined as a front end with respect to a vertical plane which coincides with said centre of rotation, a second end defined as a rear end with respect to said vertical plane, a top member with a top surface, a base plate with a bottom surface extending in a plane at a distance from the top member, two elongated side walls facing one another, and a longitudinal passage for the saw blade, extending through the cover device from the top surface to the bottom surface in a region between the front and rear ends of the cover device, said top member, said base plate, and said side walls defining between them a space, including a front portion and a rear portion, said rear portion forming part of a terminal chamber,
   (d) the blade guard and the cover device being pivotally connected to one another via a hinge in or adjacent to a lower, rear corner of the blade guard, such that the saw blade can be moved upwards and downwards in said passage in the cover device through turning in said hinge, allowing a segment of the saw blade to be moved beyond the plane of the bottom surface of the cover device, down into a work object, during which movement said centre of rotation, which is positioned above the cover device, is displaced relative to the cover device,
   (e) a terminal member provided at the rear of said hinge, comprising said terminal chamber having an inlet port associated with the longitudinal passage of the bottom surface and an outlet port which can be connected to a vacuum source, and
   (f) the direction of rotation of the saw blade being such that the rear part of said segment which has passed beyond the bottom surface of the cover device will move in a direction upwards-rearwards towards the bottom surface, said direction being clock-wise when the saw blade is viewed in a direction towards the first side of the blade.

2. An assembly according to claim 1, wherein said passage for the saw blade includes an upper slot in said top member and a bottom slot in the base plate.

3. An assembly according to claim 2, wherein the cover device has a front opening.

4. An assembly according to claim 1, wherein the cover device is provided with centering means on its top member for centering the slots of the cover device in relation to the saw blade.

5. An assembly according to claim 2, wherein the bottom slot in the base plate of the cover device is longer than the upper slot, a rear portion of the upper slot extending beyond the rear end of the upper slot, and that the dust inlet of the terminal chamber consist of a section of or of the whole of said sear section of the bottom slot.

6. An assembly according to claim 2, wherein said upper and lower slots which are essentially equally long, and that the dust inlet of the terminal chamber consists of one or more apertures in the base plate of the cover device at a distance from the rear end of the bottom slot.

7. An assembly according to claim 5, wherein a section of the base plate of the cover device extends a distance from the inlet port of the terminal chamber, and that the plane of the bottom surface of said rear portion coincides with the bottom surface of the main part of the base plate which comprises the bottom slot.

8. An assembly according to claim 1, wherein the cover device includes two sections which are separate but can be connected to one another, namely a rear section which comprises terminal member and the inlet port to and the outlet port from the terminal chamber, and a front section in which the longitudinal passage for the saw blade is provided.

9. An assembly according to claim 8, wherein the bottom surface of the front section and the bottom surface of the terminal member lie in the same plane when the two sections are assembled, and that they together form the bottom surface of the cover device.

10. An assembly according to claim 8, wherein the inlet port of the terminal chamber in the terminal member is provided in the bottom of the terminal member.

11. An assembly according to claim 8, wherein said passage communicates with the terminal chamber when the front section is connected to the terminal member.

12. An assembly according to claim 8, wherein the front section and the terminal member are connectable with one another through a quick coupling, preferably a snap lock coupling.

13. An assembly according to claim 1, wherein adjustment members are provided on at least a first element, which is one of the elements which consist of cover device and blade guard, said adjustment members being provided to be able to be displaced towards a second of said elements in order to align the blade guard in relation to the cover device so that the plane of the saw blade is maintained parallel, or is caused to adopt a new position which is parallel with a longitudinal centre line of those slots of grooves which are provided for the saw blade in the cover device.

14. An assembly according to claim 13, wherein said adjustment members are pressed against one or several surface regions on said second element or elements, which defines/define planes which are perpendicular to the axis of rotation of a hinge, which connects the blade guard and the cover device with one another.

15. An assembly according to claim 14, wherein at least one projecting member projects upwards from the cover device into the blade guard, between the saw blade and a side wall of the blade guard in a region between the hinge and the driving shaft of the saw blade, and that said adjustment member/members is/are provided to be pressed against said projecting member/members.

16. An assembly according to claim 15, wherein said projecting member consists of a holder for said adjusting member/members, which is/are provided to be pressed against a preferably flat surface region on the inside surface of the side wall of the blade guard, said surface region defining a plane which is perpendicular to the axis of rotation of the hinge.

17. An assembly according to claim 16, wherein holders are provided on each side of the saw blade, between the saw blade and each blade guard side wall, that the blade guard side walls have flat inside surfaces within at least those surface regions which face said adjustment members in all conceivable rotational positions of the blade guard, and that the surfaces within said surface regions define planes which are perpendicular to the axis of rotation of the hinge.

18. An assembly according to claim 17, wherein the adjustment members consist of adjustment screws.

\* \* \* \* \*